(12) United States Patent
Kuroyanagi

(10) Patent No.: US 7,124,185 B2
(45) Date of Patent: Oct. 17, 2006

(54) COMMUNICATION DEVICE, COMMUNICATION METHOD, COMPUTER PROGRAM, AND STORING MEDIUM FOR AN ADDRESS BOOK

(75) Inventor: Satoshi Kuroyanagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 680 days.

(21) Appl. No.: 09/835,444

(22) Filed: Apr. 17, 2001

(65) Prior Publication Data
US 2001/0037390 A1 Nov. 1, 2001

(30) Foreign Application Priority Data
Apr. 28, 2000 (JP) ............... 2000-131043

(51) Int. Cl.
*G06F 15/16* (2006.01)
*G06F 15/173* (2006.01)
*G09G 5/00* (2006.01)

(52) U.S. Cl. .............. 709/225; 709/205; 709/229
(58) Field of Classification Search ........ 709/217–219, 709/223, 225, 246, 204, 205
See application file for complete search history.

(56) References Cited

U.S. PATENT DOCUMENTS

| | | | | |
|---|---|---|---|---|
| 4,907,188 A | * | 3/1990 | Suzuki et al. ............... 709/219 |
| 5,113,519 A | * | 5/1992 | Johnson et al. ............. 707/201 |
| 5,560,008 A | * | 9/1996 | Johnson et al. ............. 709/229 |
| 5,727,155 A | * | 3/1998 | Dawson ..................... 709/205 |
| 5,752,040 A | | 5/1998 | Kaneko et al. ............. 395/162 |
| 5,799,320 A | * | 8/1998 | Klug .......................... 709/204 |
| 6,006,282 A | * | 12/1999 | DeLeeuw et al. ............. 710/5 |
| 6,240,414 B1 | * | 5/2001 | Beizer et al. .................. 707/8 |
| 6,269,369 B1 | * | 7/2001 | Robertson .................. 709/217 |
| 6,289,348 B1 | * | 9/2001 | Richard et al. ............. 709/203 |
| 6,411,965 B1 | * | 6/2002 | Klug .......................... 709/204 |
| 6,654,032 B1 | * | 11/2003 | Zhu et al. ................... 709/205 |
| 6,662,210 B1 | * | 12/2003 | Carleton et al. ............ 709/204 |

\* cited by examiner

*Primary Examiner*—Patrice Winder
*Assistant Examiner*—Hassan Phillips
(74) *Attorney, Agent, or Firm*—Fitzpatrick, Cella, Harper & Scinto

(57) ABSTRACT

An address book accessed from a local panel is made accessible to Web users (remote panels) connected to a network, by Web server functions. Also, whether to permit or deny requests for changing the data of the address book from the local panel, and requests for changing the data of the address book from the remote panels, is determined.

16 Claims, 24 Drawing Sheets

FLOWCHART OF WEB CLIENT ACTIONS

FIG. 9 DETAILED INFORMATION SCREEN

SEARCH OBJECT CLASS LIST DISPLAY

SEARCH OBJECT ATTRIBUTES LIST DISPLAY

FIG. 13  SEARCH OBJECT CONDITIONS LIST DISPLAY

SEARCH OBJECT ADDRESS BOOK LIST DISPLAY

SEND MAIN SCREEN

SEND INITIAL SCREEN

DESTINATION DETAILS (NEW)

DESTINATION DETAILS (PERSON)

DESTINATION DETAILS (DATABASE)

DESTINATION DETAILS (GROUP)

COMMUNICATION DEVICE, COMMUNICATION METHOD, COMPUTER PROGRAM, AND STORING MEDIUM FOR AN ADDRESS BOOK

BACKGROUND OF THE INVENTION

1. Field of the Invention

The present invention relates to a communication device, communication method, and storing medium, and particularly relates to a communication device which is connected to a network and has address book functions for managing destination information and the like of another party with which communication is made.

2. Description of the Related Art

Nowadays, communication devices capable of printing images from different output devices, registering files in servers, and sending facsimiles by public telephone lines, via computer networks such as the Internet, have been realized.

When outputting images from the communication device, there are output types of various formats and various output destinations, so inputting the destination each time a transmission is to be performed can be troublesome. Accordingly, the transmission destinations for the images are registered in a database called an address book. When one of the destinations registered therein is selected the destination of the transmission is thereby selected.

However, viewing the contents of the address book has required using, viewing, and operating a small operating screen attached to the communication device. This has led to difficulty searching or confirming detailed contents. Additionally, only one user can use the operating screen at a time, which has been extremely unhandy in the event that multiple users desire to use the operating screen.

SUMMARY OF THE INVENTION

The present invention has been made in light of the above problems.

Accordingly, it is an object of the present invention to allow two or more users to simultaneously share address book data via a network.

It is another object of the present invention to prevent the problem of images being sent to incorrect destinations by unpredicted changes to the address database.

To this end, the communication device according to an embodiment of the present invention has functions for deciding to permit or deny address book data changing requests for changing the data of the address book from a Resident Panel, and address book data changing requests for changing the data of the address book from other devices on the network.

More preferably, the communication device according to an embodiment of the present invention denies address book data changing requests from other devices on the network in the event that access to the address book from the Resident Panel is active.

More preferably yet, the communication device according to an embodiment of the present invention displays a first guide display on a Resident Display for accessing the address book from the Resident Panel, and denies address book data changing requests from the second access means synchronously with starting to display the first guide display.

Further objects, features and advantages of the present invention will become apparent from the following description of the preferred embodiments with reference to the attached drawings.

DESCRIPTION OF THE PREFERRED EMBODIMENTS

The following is a description of an embodiment of the communication device, communication method, and storing medium according to the present invention, with reference to the drawings.

Figure 1:
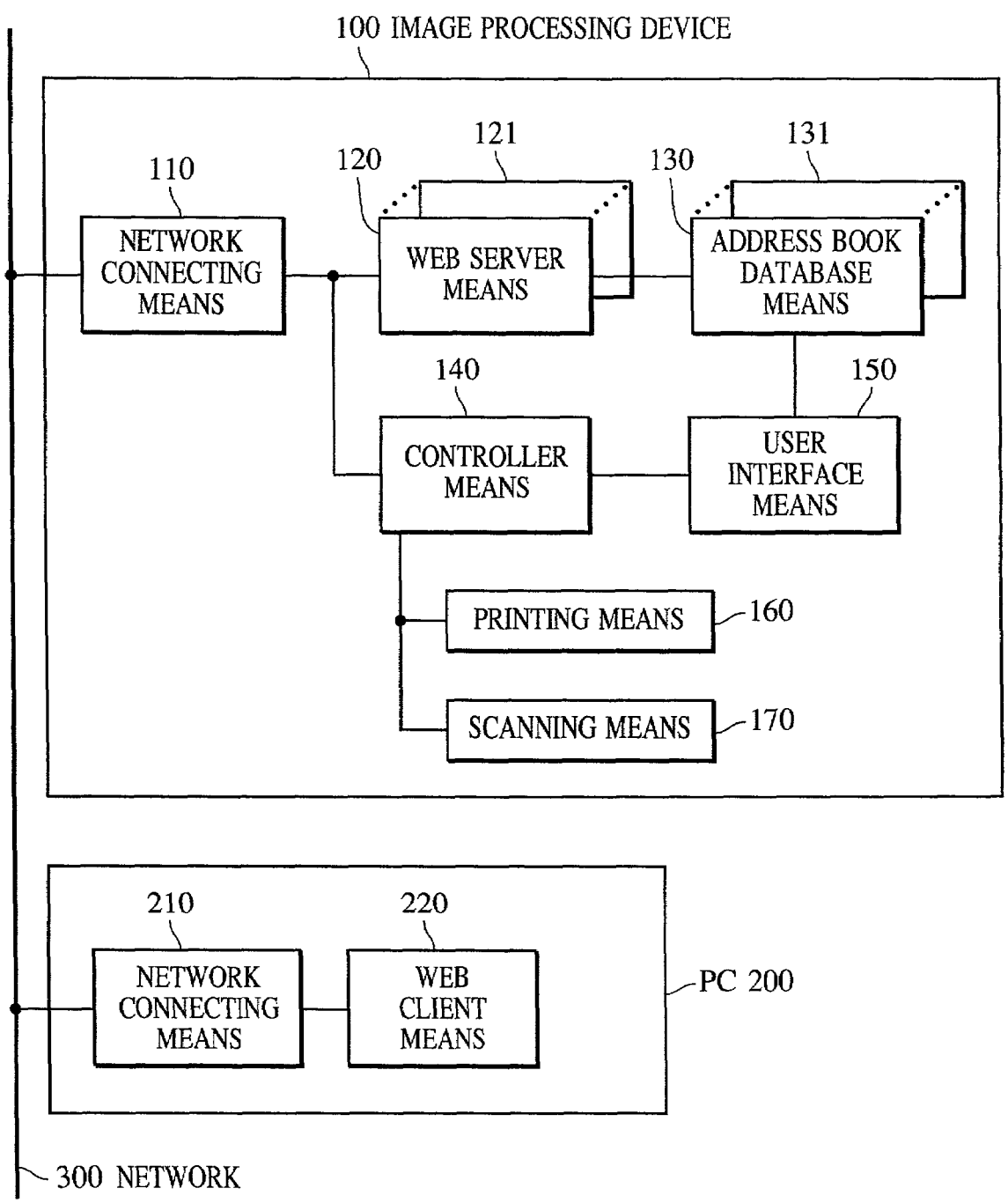
FIG. 1 is a block diagram illustrating the overall configuration of an image processing device according to a first embodiment.

FIG. 1 is a block diagram illustrating the configuration of the principal components of an image processing device which is an example of a communication device according to the present embodiment.

In FIG. 1, reference numeral 300 denotes a network. An image processing device 100 is connected to this network 300. Reference numeral 110 contained therein denotes network connecting means.

Reference numeral 120 denotes a Web server means, 130 denotes an address book database means, 140 denotes a controller means, 150 denotes a user interface (having operating keys and a display), 160 denotes a printing means, and 170 denotes a scanning means.

Also, a PC (personal computer) 200 is connected to the network 300 with a network connecting means 210 and Web client 220 contained therein.

The network connecting means 110 is connected to the network 300, and transmits and receives data with the network 300. Also, the network connecting means 110 selects and uses a server means not in use (not in HTTP session) from the multiple server means 120, 121, and so forth.

The Web server means 120 is server means capable of communication by HTTP (HyperText Transfer Protocol), and acts in a manner corresponding to the HTTP contents. The address book database means 130, 131, and so forth are databases containing the destinations of image data to which transfer is to be made from the controller means 140, of which the destinations can be selected and changed by the user interface means 150. The address book database means 130 is capable of holding multiple address book databases, and can create databases separately for individuals or for categories, for example.

Also, the address book database means 130, 131, and so forth, are of a configuration accessible from the client PC 200 on the network 100. That is to say, a display screen the same as the address book registration screen displayed on the display of the user interface means 150 is generated as HTML data or XML data, and is supplied to the Web client means 220 by the Web server means 120. At this time, the configuration is such that instructions indicating that reception from the user interface means 150 is enabled can be instructed from the Web client means 220, by including a mechanism for performing reception of instructions from the Web client in the HTML data, such as CGI or the like.

Thus, a guide display is provided to the PC (remote user) on the network 300 by general-purpose HTML data or the like, so the remote user is capable of accessing the address book database means 130 using a Web browser.

Figure 6:
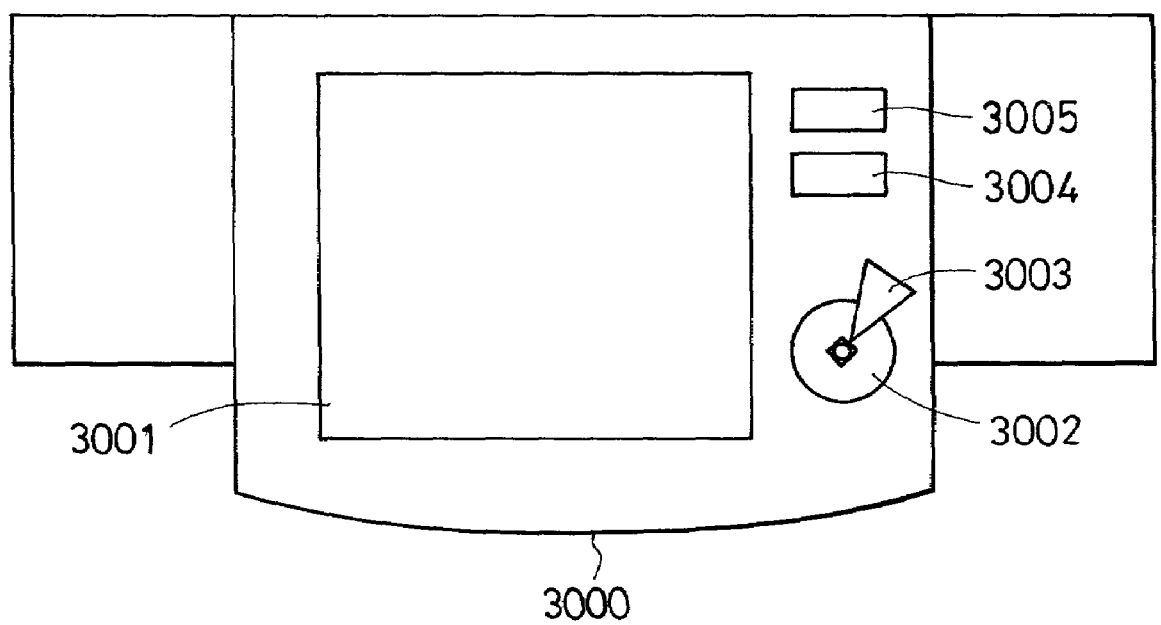
FIG. 6 is a diagram illustrating the entire operating unit.

Conversely, a guide display is provided to local users accessing the address book from the user interface means 150 by the display of the operating panel shown in FIG. 6, so guide display data unique to the device is generated.

Of course, load of designing the device can be reduced by providing the guide display data to be displayed on the operating panel shown in FIG. 6 as HTML data as well.

The controller means 140 is capable of obtaining image data from the scanning means 170 and outputting to the printing means 160. Also, the configuration is such that image data obtained with another image output device as the destination thereof can be transferred and output, and saved in a server database transferred with the server as the destination thereof.

<Description of the Overall System>

Figure 4:
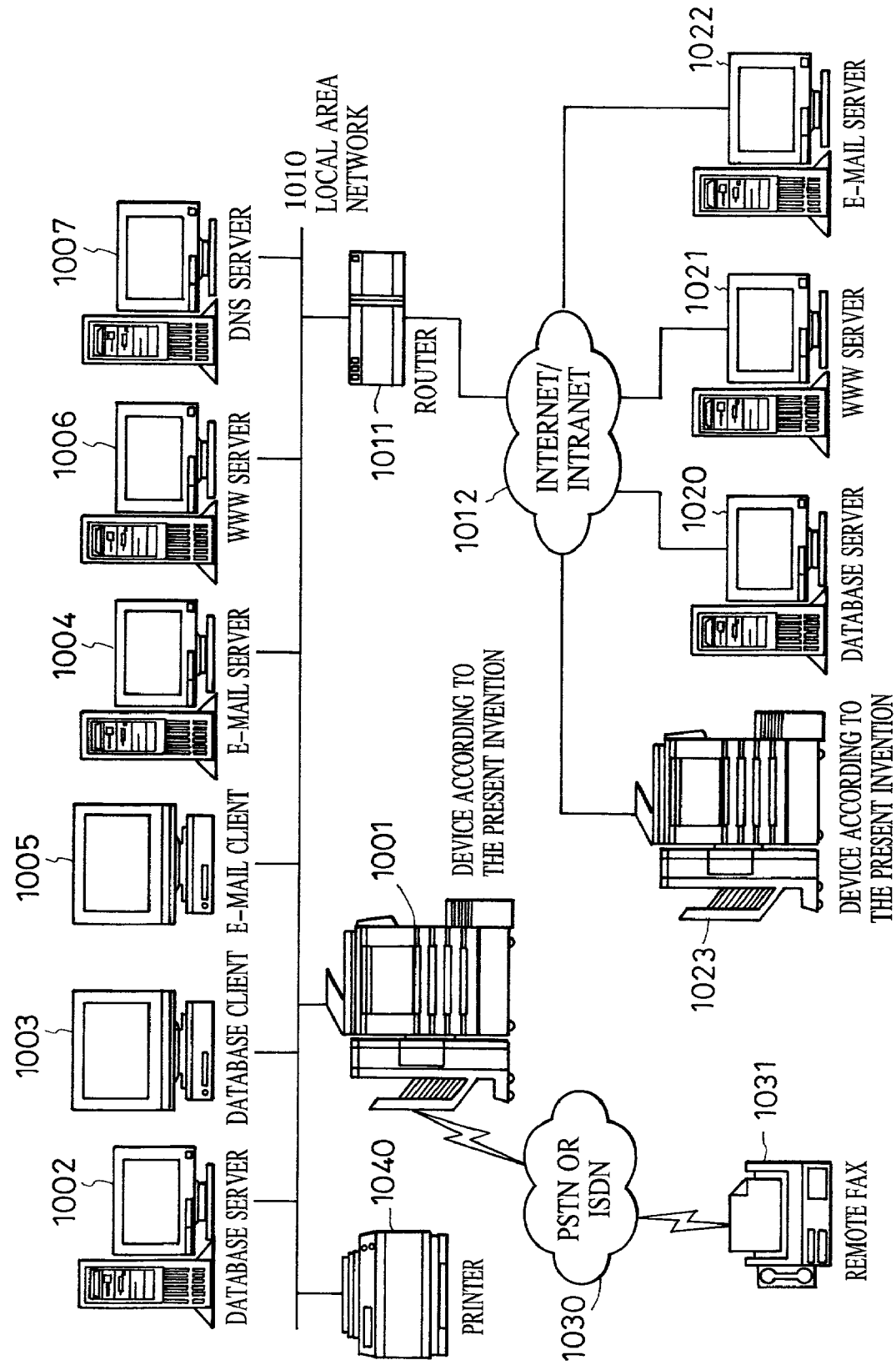
FIG. 4 is a diagram illustrating the overall configuration of a network system.

FIG. 4 shows the configuration of the overall system of the present embodiment. In FIG. 4, reference numeral 1001 denotes the image processing device according to the present embodiment, comprising a later-described scanner and printer, and having functions of sending images read in by the scanner onto a Local Area Network 1010 (hereafter referred to as "LAN") and printing images received from the LAN 1010 with the printer.

Also, the configuration enables images read with the scanner to be transmitted to a PSTN or ISDN 1030 by unshown facsimile transmitting means, and printing images received from the PSTN or ISDN with the printer. Reference numeral 1002 denotes a database server, which manages binarized images and multi-value images read in by the image processing device 1001 according to the present embodiment as a database.

Reference numeral 1003 denotes a database client of the database server 1002, having functions of viewing, searching, etc., of the image data stored in the database 1002. Reference numeral 1004 denotes an e-mail server, capable of receiving images read by the image processing device 1001 according to the present embodiment as e-mail attachments. Reference numeral 1005 denotes an e-mail client, capable of receiving and viewing e-mail received by the e-mail server 1004, and transmitting e-mail.

Reference numeral 1006 denotes a WWW server for providing HTML documents to the LAN 1010, having functions for printing HTML documents provided with the WWW server by the image processing device 1001 according to the present embodiment. Reference numeral 1007 denotes a DNS (Domain Name System) server, provided for converting numbers (IP addresses) appropriated to each computer connected to the Internet into text strings readily understood by humans.

That is, with TCP/IP which is the communication protocol for the Internet, computers are identified by numerical strings called IP addresses. However, IP addresses are 8-bit numerical values, and thus are not readily remembered by humans and consequently not practical. Thus, the DNS serves to convert the IP addresses into text strings readily understood by humans. Reference numeral 1011 denotes a router, for linking the LAN 1010 and the Internet/Intranet 1012.

Devices the same as the above-described database server 1002, WWW server 1006, e-mail server 1004, and the image processing device 1001 according to the present embodiment, are linked to the Internet/Intranet 1012, as 1020, 1021, 1022, and 1023, respectively.

On the other hand, the image processing device 1001 according to the present embodiment is configured so as to be capable of transmission and reception with the facsimile device 1031 via PSTN or ISDN 1030. Also, a printer 1040 is linked on the LAN as well, so as to be able to print images read by the image processing device 1001 according to the present embodiment.

<Overall Configuration of Software Block>

Figure 5:
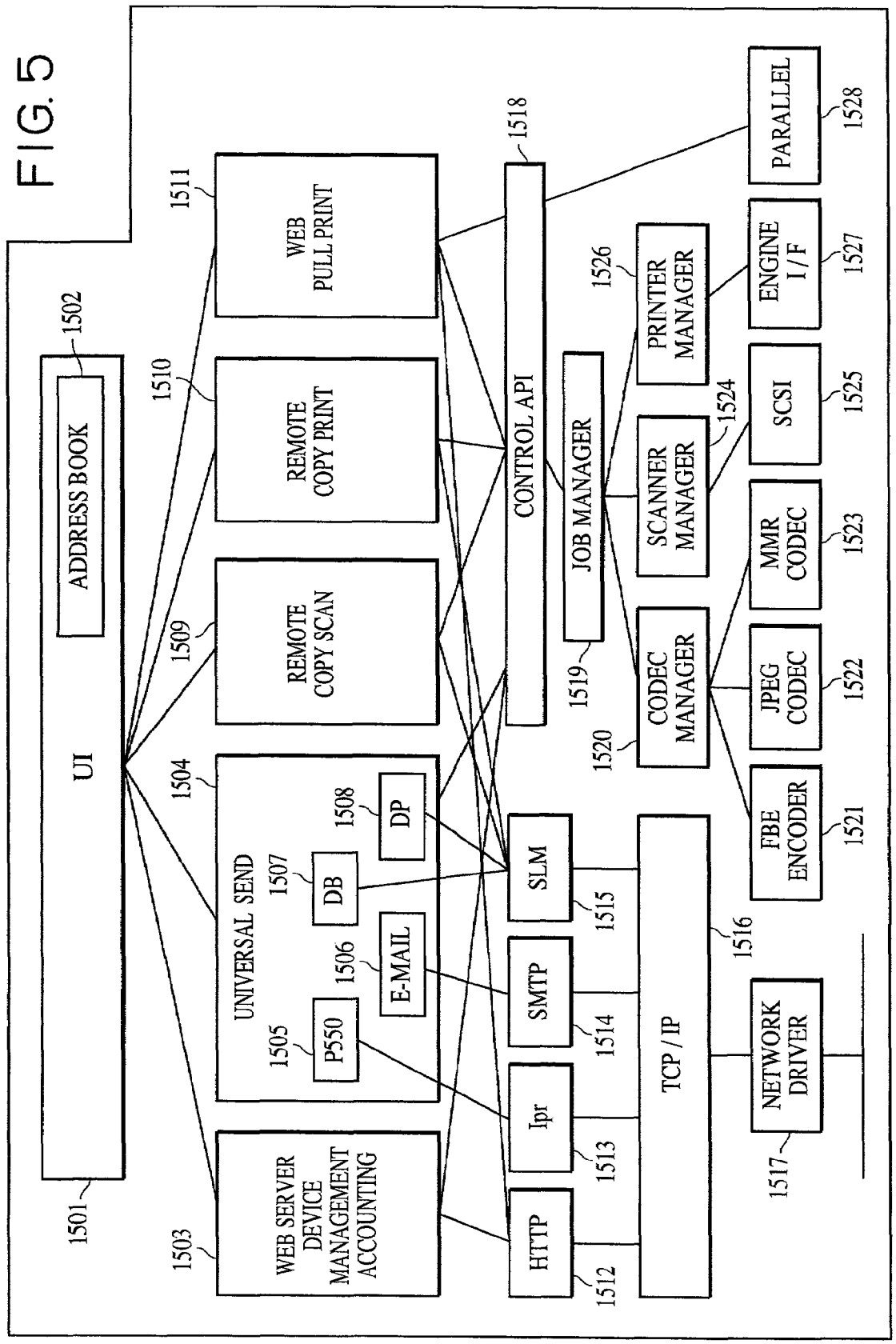
FIG. 5 is a block diagram illustrating the functional configuration of a compounded device according to the present embodiment.

FIG. 5 is a block diagram illustrating the functional configuration of a compounded device according to the present invention.

In FIG. 5, reference numeral 1501 denotes a user interface (UI), and is a module for going between devices at the time of performing various operations and settings of the compounded device according to the present embodiment. This module follows the operations of the operator to transfer input information to the later-described various modules and commission processing thereof, setting data and the like, and so forth.

Reference numeral 1502 denotes an address book, i.e., a database module for managing destinations for sending data, destinations for communication, and so forth. The contents of the address book 1502 are subjected to addition, deletion, and obtaining of data by operation of the UI 1501, and uses for sending data to the later-described modules and providing information regarding the destination of communication, by operation of the operator.

Reference numeral 1503 denotes a Web server module, which is used for making notification of managed information of the compounded device according to the present embodiment according to requests from a Web client not shown in the Figure. The managed information is read by a later-described control API 1518, and is notified to the Web client via later described HTTP 1512, TCP/IP 1516, and a network driver 1517.

Reference numeral 1504 denotes a universal send, i.e., a module which handles distribution of data, for distributing data instructed by the operator from the UI 1501 to the communication output destination instructed in the same manner. Also, when the operator has instructed the generation of distribution data using the scanner functions of the device according to the present embodiment, the device is activated via the later-described control API 1518, thereby generating data.

Reference numeral 1505 denotes a module executed in the event that a printer has been specified as the output destination within the universal send 1504. Reference numeral 1506 denotes a module executed in the event that an e-mail address has been specified for the communication destination within the universal send 1504. Reference numeral 1507 denotes a module executed in the event that a database address has been specified for the communication destination within the universal send 1504. Reference numeral 1508 denotes a module executed in the event that a compounded device the same as the image processing device according to the present embodiment has been specified for the output destination within the universal send 1504.

Reference numeral 1509 denotes a Remote Copy Scan module which uses the scanner functions of the compounded device according to the present embodiment and has as the output destination thereof other compounded devices connected by network or the like. The Remote Copy Scan module 1509 also performs processing in the same manner as the copy functions realized by the present compounded device.

Reference numeral 1510 denotes a Remote Copy Print module which uses the scanner functions of the compounded device according to the present embodiment and has as the input thereof other compounded devices connected by network or the like. The Remote Copy Print module performs processing in the same manner as the copy functions realized by the present compounded device alone.

Reference numeral 1511 denotes a Web Pull Print, i.e., a module for reading and printing various types of home page information on the Internet or Intranet.

Reference numeral 1512 denotes a module used at the time of the present compounded device communicating by HTTP, for providing communication to the aforementioned Web server 1503 and Web Pull Print 1511 by the later-described TCP/IP 1516 module.

Reference numeral 1513 denotes an IPR module, for providing communication to the printer module 1505 within the aforementioned Universal Send 1504 by the later-described TCP/IP 1516 module.

Reference numeral 1514 denotes an SMTP module, for providing communication to the e-mail module 1506 within the aforementioned Universal Send 1504 by the later-described TCP/IP 1516 module.

Reference numeral 1515 denotes an SLM, i.e., a Salutation Manager module, for providing communication to the database module 1517, DP module 1518, and Remote Copy Scan 1509 module and Remote Copy Print 1510 module within the aforementioned Universal Send 1504 by the later-described TCP/IP 1516 module.

Reference numeral 1516 denotes a TCP/IP communication module for providing network communication to the aforementioned modules by the later-described network driver 1517. Reference numeral 1517 denotes the network driver, for controlling portions physically connected to the network.

Reference numeral 1518 denotes a Control API, for providing interfacing with downstream modules such as the later-described job manager 1519 and the like to upstream modules such as the Universal Send 1504, thereby reducing the interdependence between upstream and downstream modules and increasing the applicability of each.

Reference numeral 1519 denotes a job manager, for interpreting processing instructed from the various modules described above via the Control API 1518, and providing instructions to the later-described modules. Also, this module centrally manages hardware-related processing executed within the present compounded device.

Reference numeral 1520 denotes a CODEC manager, for managing and controlling various types of compression and decompression of data within processing instructed by the job manager 1519.

Reference numeral 1521 denotes an FBE encoder, for compressing data read in by scanning processing executed by the job manager 1519 and scan manager 1524 according to the FBE format.

Reference numeral 1522 denotes a JPEG CODEC, for performing JPEG compressing of data read in and JPEG rendering processing of printing data, in scanning processing executed by the job manager 1519 and scan manager 1524 and printing processing executed by the print manager 1526.

Reference numeral 1523 denotes an MMR CODEC, for performing MMR compressing of data read in and MMR rendering processing of printing data, in scanning processing executed by the job manager 1519 and scan manager 1524 and printing processing executed by the print manager 1526.

Reference numeral 1524 denotes a scan manager, for managing and controlling scanning processing instructed by the job manager 1519.

Reference numeral 1525 denotes a SCSI driver, for performing communication between the scan manager 1524 and the scanner unit which the present compounded device has internally connected thereto.

Reference numeral 1526 denotes a print manager, for managing and controlling printing processing instructed by the job manager 1519.

Reference numeral 1527 denotes an engine I/F driver, for providing an interface between the print manager 1526 and the printing unit.

Reference numeral 1528 denotes a parallel port driver, for providing an interface at the time of the Web Pull Print 1511 outputting data to an output device not shown in the figure via the parallel port.

<User Interface application>

Next, description will be made regarding the address book 1502. This address book is stored within a nonvolatile storage device (non-volatile memory, hard disk, etc.) provided within the device of the present embodiment, with the characteristics of other devices connected to the network listed therein. Items included therein are, for example: the proper names and aliases of devices, network addresses of the devices, network protocols which can be processed by the devices, document formats which can be processed by the devices, compression types which can be processed by the devices, image resolutions which can be processed by the devices, paper sizes of paper which can be supplied in the case of printer devices, paper feeding tiers information, folder names capable of storing documents in the case of a server (computer) device, and so forth.

The applications described next are capable of distinguishing the characteristics of the distribution destination from information listed in the address book 1502.

<Remote Copy Application>

The remote copy application distinguishes resolution information which the device specified as the distribution destination is capable of processing from the address book 1502, follows this to compress a binary image read by the scanner using known MMR compression, formats this as a known TIFF (Tagged Image File Format) file, and transmits this to the printer device on the network via SLM 4103.

Though not described in detail, the above SLM 4103 is a type of network protocol containing device control information called Salutation Manager (or Smart Link Manager) which is a known art.

<Overview of the Operating Unit>

First, a configuration example of the operating unit is shown in FIG. 6. The liquid crystal display unit (3001) is configured with a touch panel applied upon a liquid crystal display, so as to display a system operating screen and also in the event that a displayed key is pressed, the position information thereof is transferred to the controller CPU. The start key (3002) is used for starting the reading action of the original image. A two-color LED, of green and red, is positioned at the center of the start key 3002, indicating whether or not the start key is in a usable state.

The stop key 3003 acts to stop actions underway. The ID key (3004) is used for inputting the user ID of the user. The reset key (3005) is used for initializing settings from the operating unit.

Now, the operating unit of the liquid crystal display, keys, and the like, make up the components of the user interface means shown in the block diagram in FIG. 1.

The following is a detailed description of the screens of the operating unit.

<Operating Screen>

Figure 7:
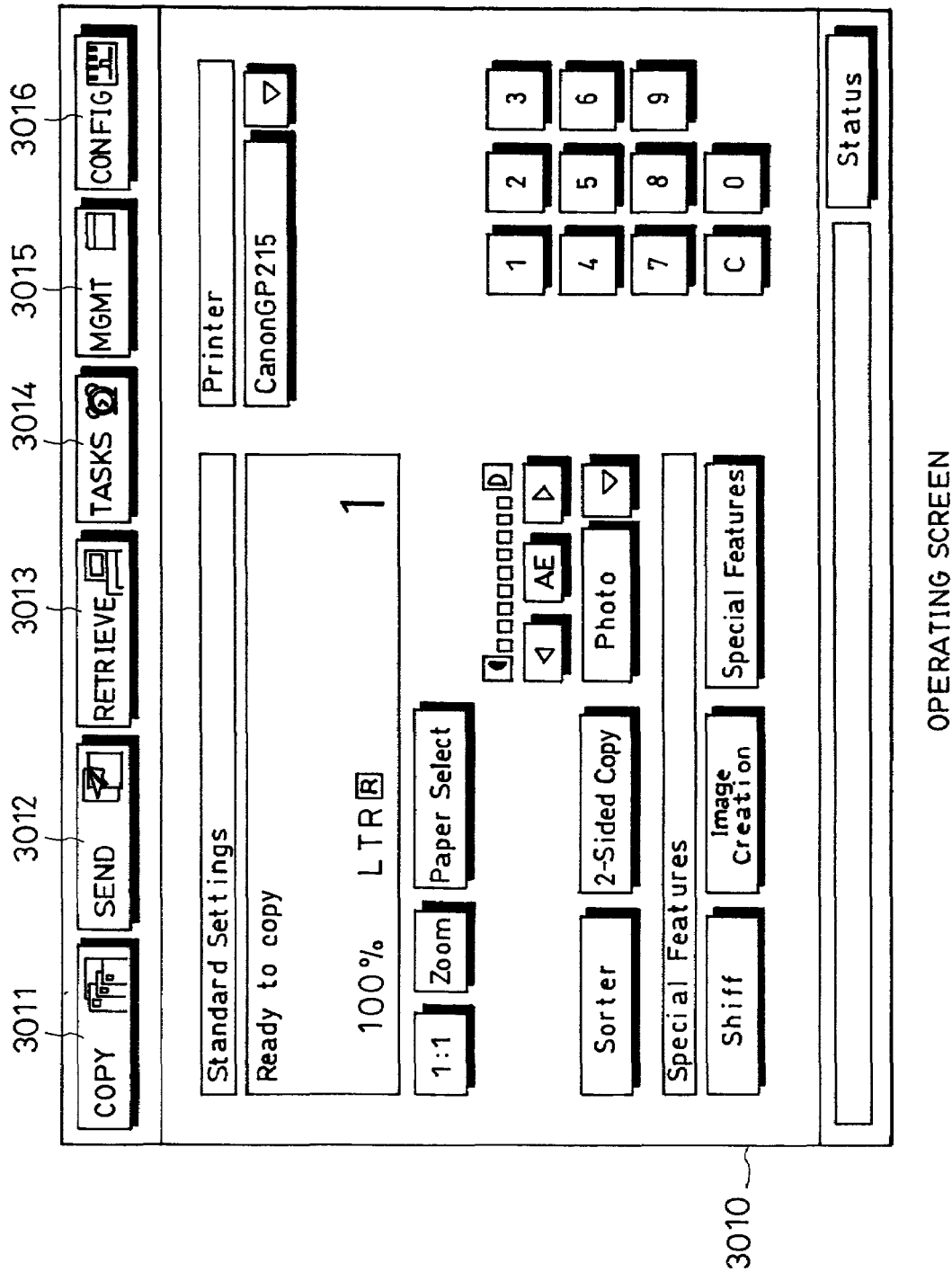
FIG. 7 is a diagram illustrating an example of an operating screen.
Figure 8:
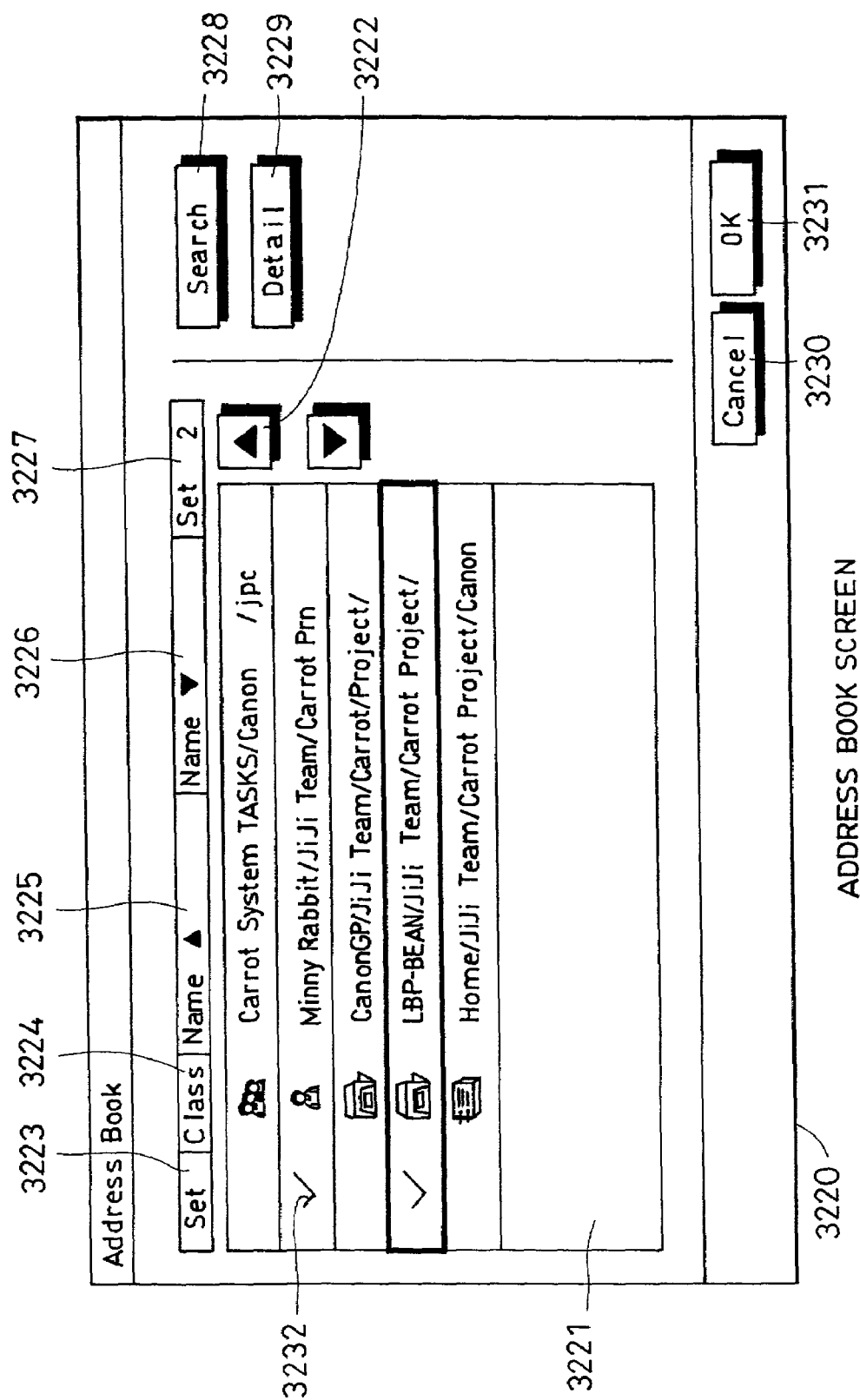
FIG. 8 is a diagram illustrating an example of an address book screen.
Figure 9:
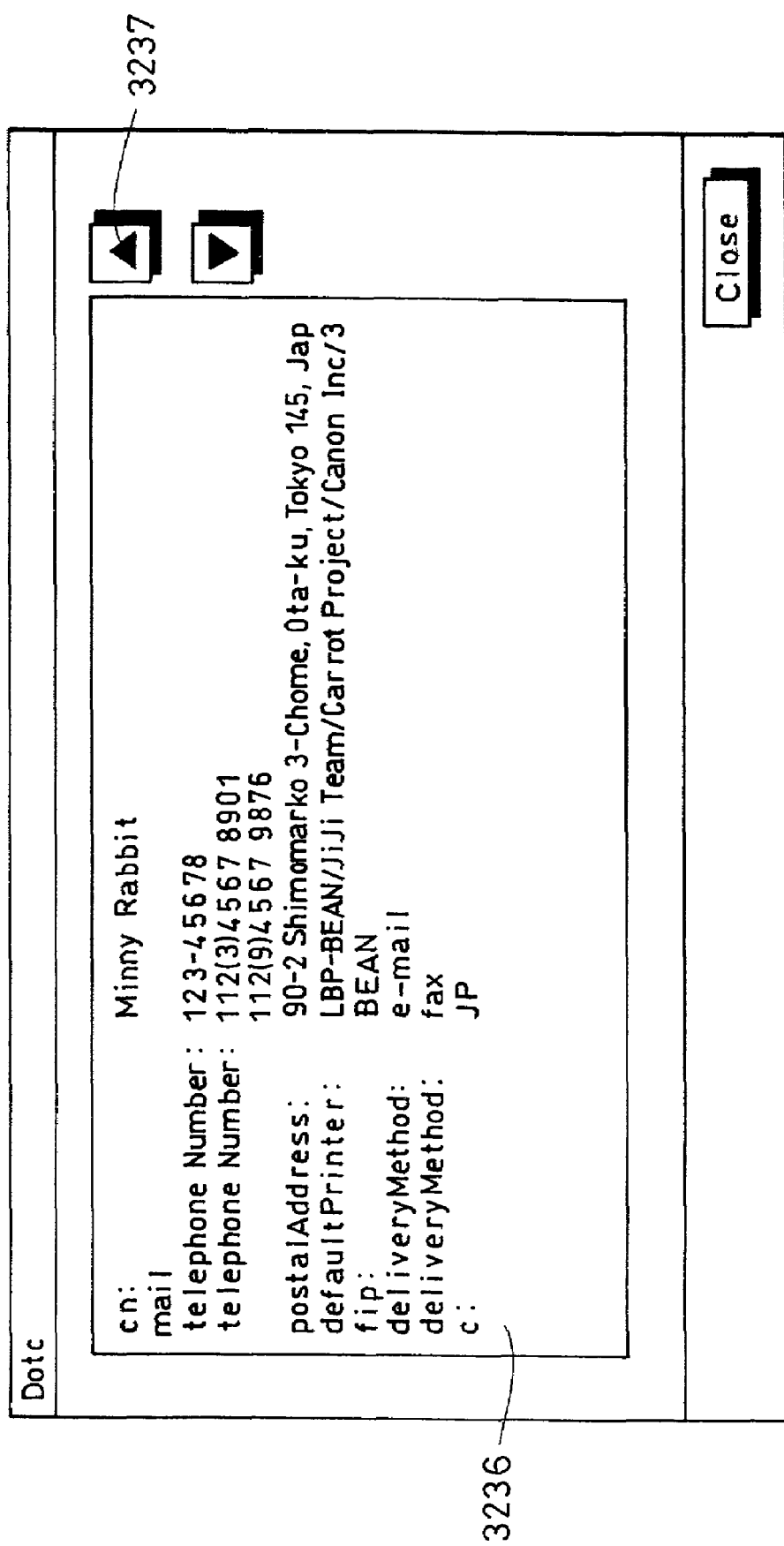
FIG. 9 is a diagram illustrating an example of a detailed information screen of the address book.
Figure 10:
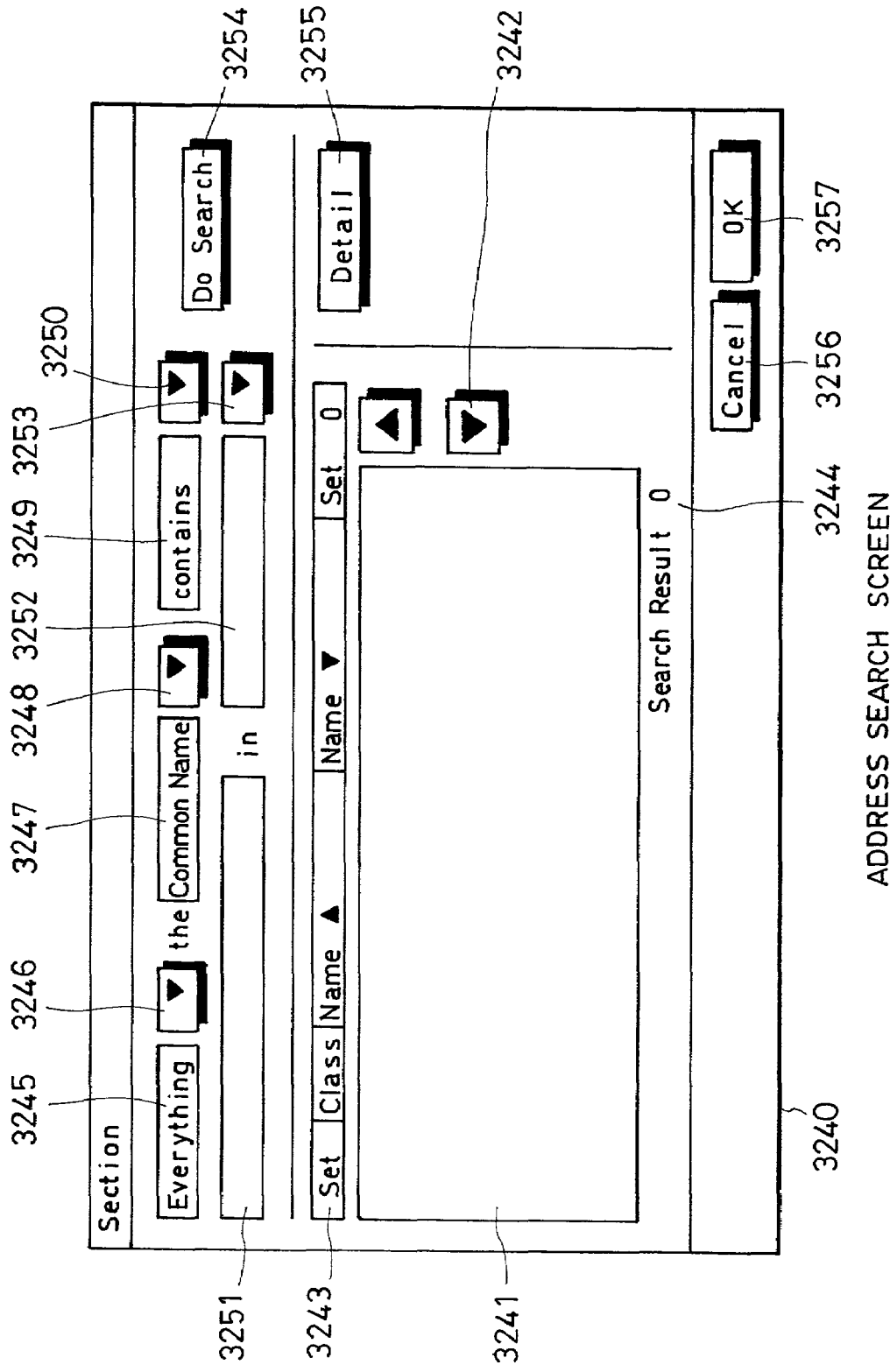
FIG. 10 is a diagram illustrating an example of an address search screen.

The functions which the device according to the present embodiment provide are, as shown in the operating screen explanatory diagram in FIG. 7, divided into the six major categories of COPY/SEND/RETRIEVE/TASKS/MANAGEMENT/CONFIGURATION, and these correspond with the six main tabs (COPY/SEND/RETRIEVE/TASKS/MGMT/CONFIG) (3011 through 3016) displayed at the top of the operating screen 3010.

Pressing one of these main tabs switches to the screen for the corresponding category. In the event that switching to another category is not permitted, the display color of the main tab changes, and pressing the main tab yields no response.

The COPY 3011 includes functions for performing normal document photocopying using the scanner and the printer of the device itself, and functions for performing document photocopying using the scanner of the device itself and a printer connected to the network (remote copy).

The SEND 3012 is a function for transferring a document placed on the scanner of the device itself to e-mail, a remote printer, a facsimile, file transfer protocol (FTP), and a database.

The RETRIEVE 3013 is a function for externally obtaining a document, and printing this with the printer of the device itself. Means for obtaining the document include WWW e-mail, file transfer, and facsimile.

The TASK 3014 automatically processes documents externally sent, such as facsimiles and Internet prints, and periodically generates and manages tasks for performing RETRIEVE 3013.

The MANAGEMENT 3015 performs management of jobs, address books, bookmarks, documents, account information, and so forth. At the CONFIGURATION 3016, settings regarding the device itself (network, clock, etc.) are performed.

Next, the address book screen displayed on the Web client will be described with reference to FIGS. 21 through 26. Pressing the address book button (3208) for the address book sub screen displays the address book sub screen (3220).

A destination to which a selection mark (3232) is attached in the address book display area (3221) is added to the destination display area (3202) of the send main screen by pressing the OK button (3231). For displaying the address book, pressing the sort item setting buttons (3224 through 3226) sorts by class, in ascending order of name, and descending order of name.

The number of items with selection marks attached thereto is displayed on the item selection number display area (3227). Pressing the OK button (3231) or the Cancel button (3230) closes the address book sub screen, and the send main screen is displayed.

Pressing the Detail button (3229) in the state of one of the items from the address book selected displays the Detail sub screen (2235). All information obtained from the address book is displayed on the Detail sub screen as information of the selected item.

<Search Sub Screen>

Pressing the Search button (3228) in the address book sub screen brings up a search sub screen (3240) for searching for destinations from a local address book or from an external address server.

The upper part of the search sub screen is a search conditions setting part. The search object class display area (3245), search object attributes display area (3247), search object conditions display area (3249), and search object address book display area (3252) show the currently selected items.

Figure 11:
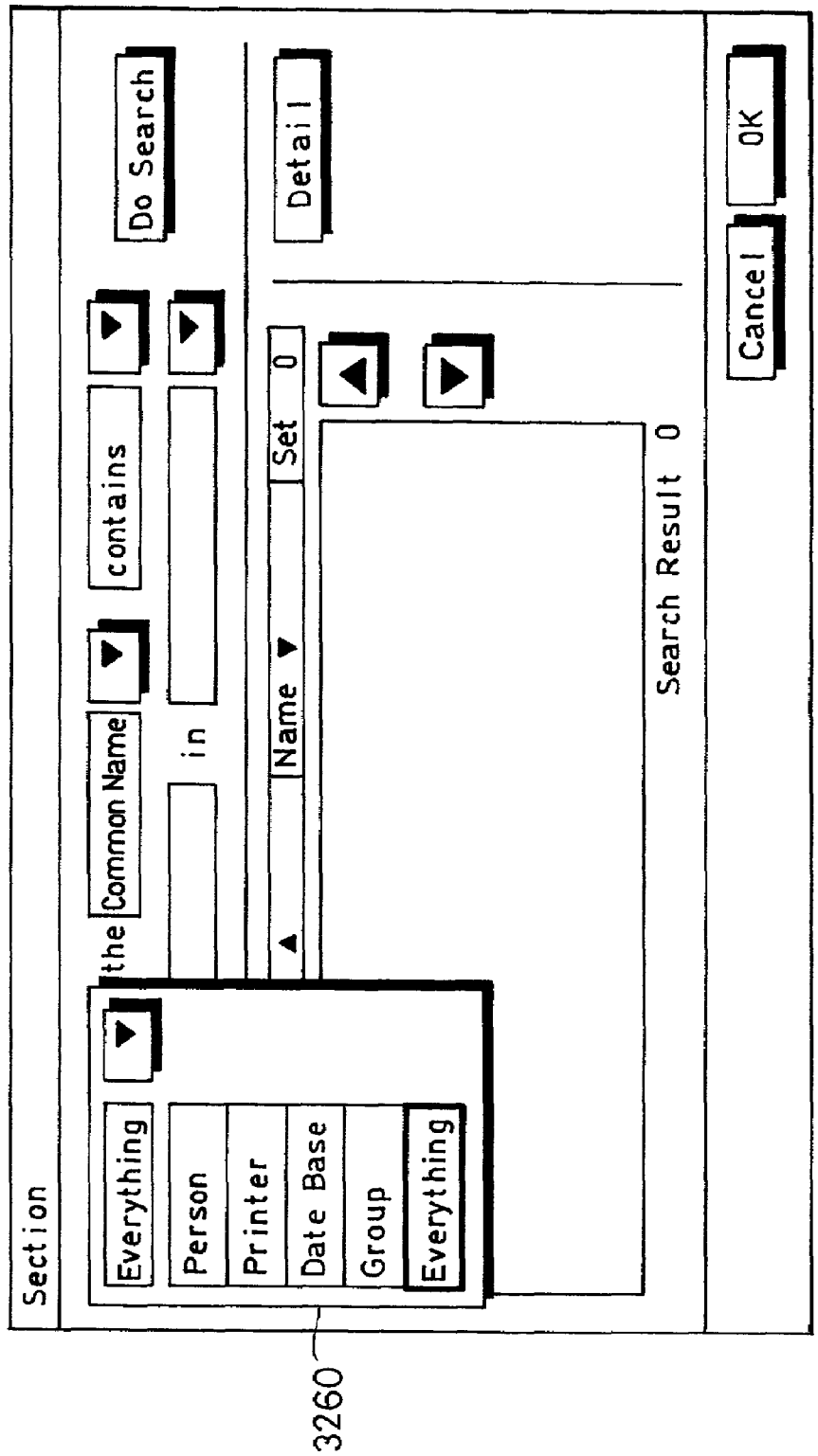
FIG. 11 is a diagram illustrating an example of a search object class list display.

Pressing the Search object class button (3246) displays a search object class list (3260), as shown in FIG. 11. The item selected from this list is displayed on the search object class display area.

Figure 12:
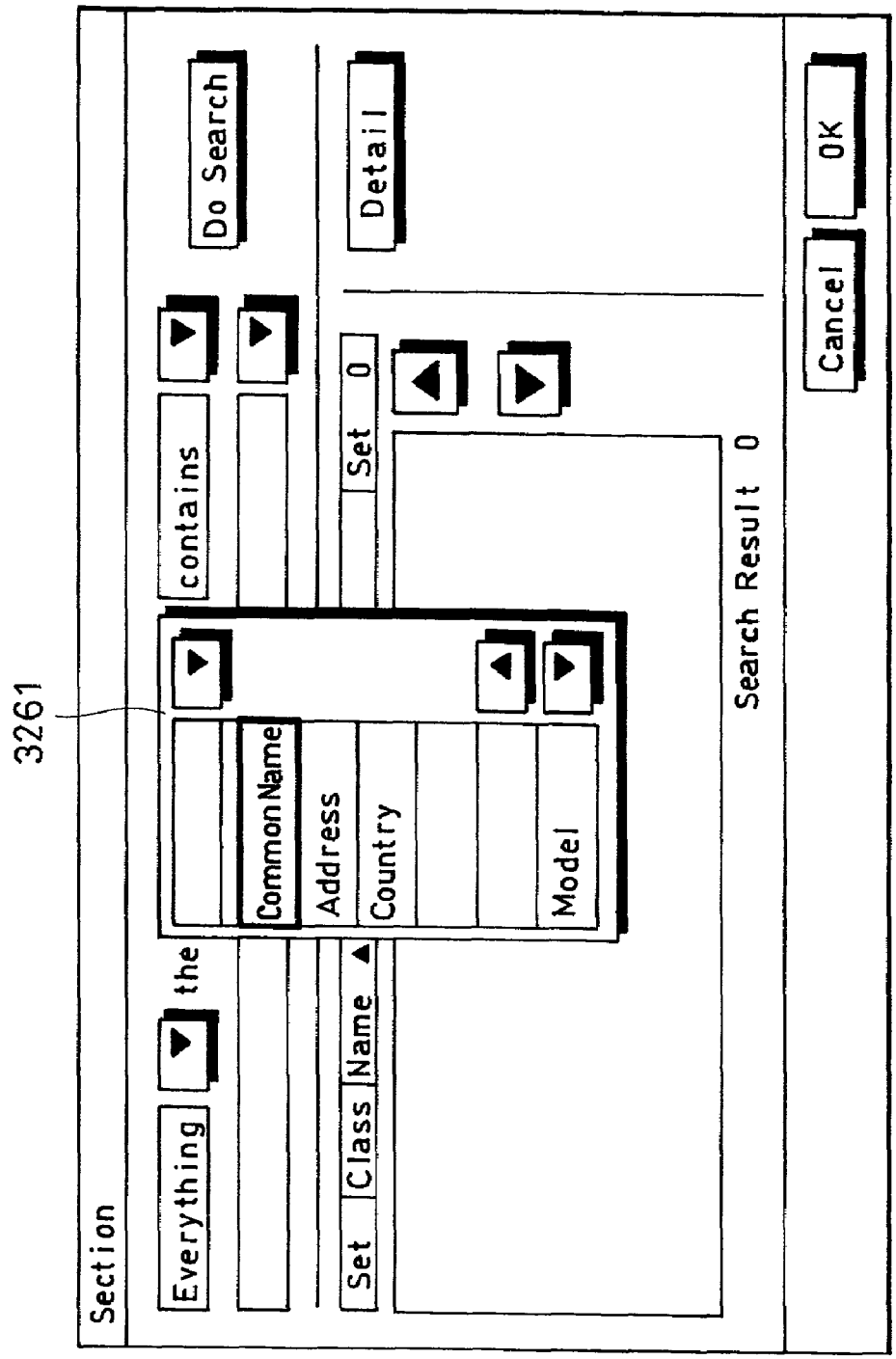
FIG. 12 is a diagram illustrating an example of a search object attributes list display.

Pressing the Search object attributes setting button (3248) displays a search object attributes list (3261), as shown in FIG. 12. The attributes displayed in this list change as follows according to the selected search object class: Common name/Address/Country (class: person), Common name/Owner/Location/Model/Type/Resolution/Color/Finisher (class: printer), Common name/Member (class: group), and All attributes (class: everything).

Figure 13:
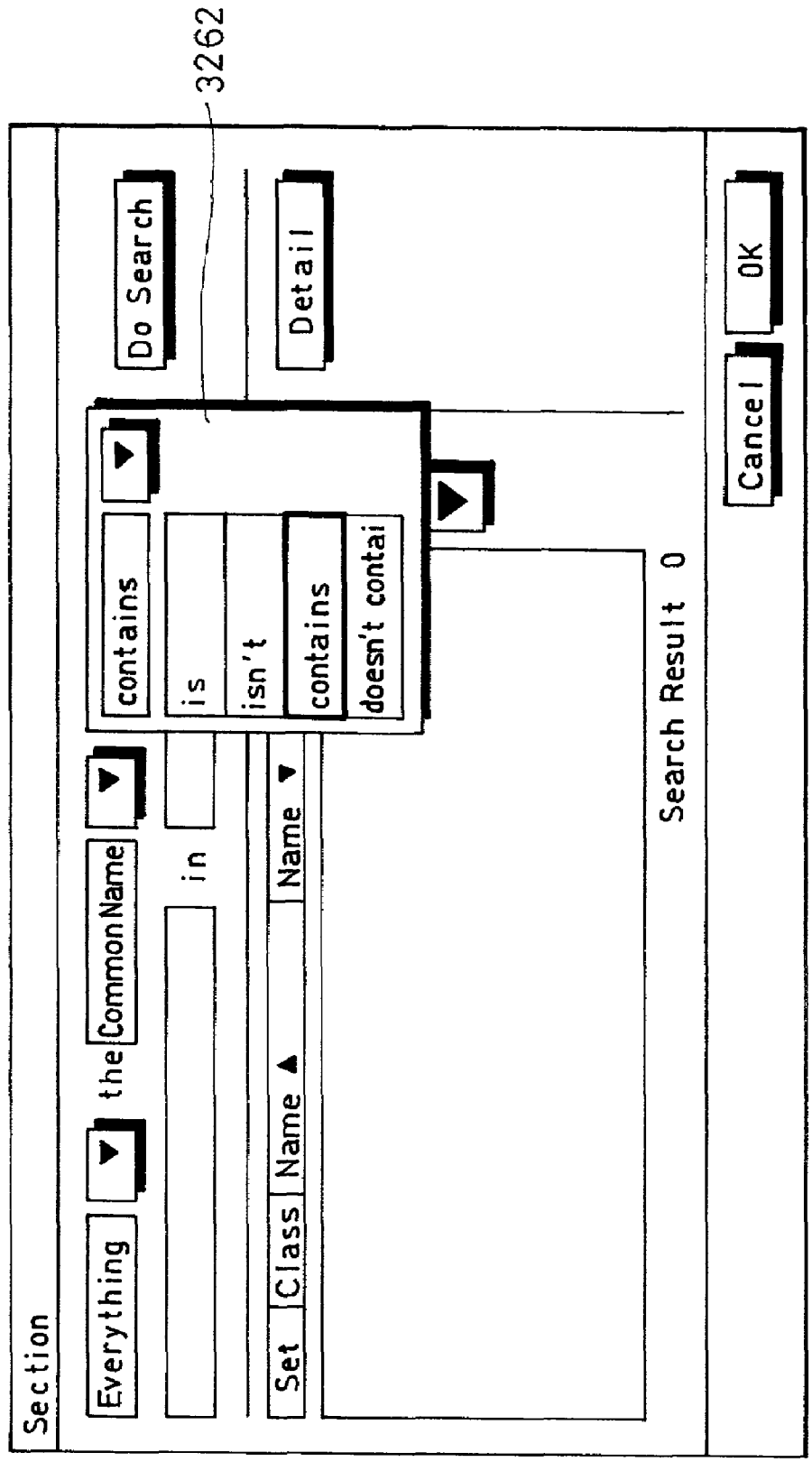
FIG. 13 is a diagram illustrating an example of a search object conditions list display.

Also, pressing the Search object conditions setting button (3250) displays a search object conditions list (3262), as shown in FIG. 13, and conditions are selected from the list.

Figure 14:
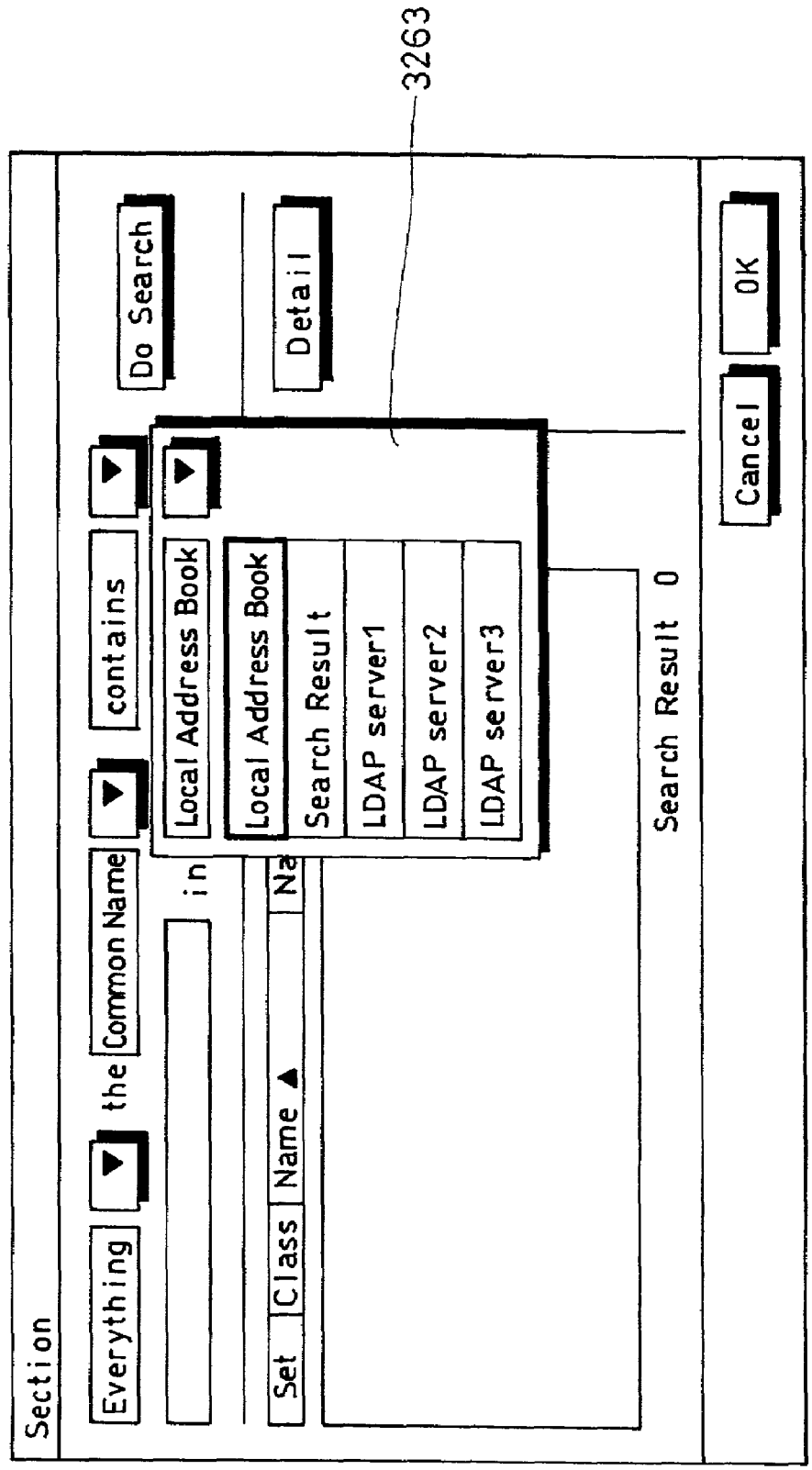
FIG. 14 is a diagram illustrating an example of a search object address book list display.

Also, pressing the Search object address book setting button (3253) displays a search object address book list (3263), as shown in FIG. 14, and selection can be made from the list.

Also, pressing the Search object attributes value input area (3251) displays a full keyboard not shown in the drawings, thereby enabling input of values.

Pressing the Do Search button (3254) performs a search according to the set search conditions. The search results are displayed in the search results display area (3241), and the number thereof is displayed in the search results item number display area (3244).

Pressing the Detail button (3255) with one of the items in the search results display area selected displays detailed information (3235) for that item. A selection mark is added to items within the search results display area to be added to the destination.

Pressing the OK button (3257) closes the search sub screen, the flow returns to the Send main screen, and items to which the selection mark were attached are added to the destinations. Pressing the Cancel button (3256) closes the search sub screen, and the flow returns to the Send main screen, but no changes are made to the destinations.

<Detailed Destination Sub Screen>

Pressing the New button (3209) on the Send main screen brings up the Person class detail sub screen (3270), thereby enabling settings for new destinations. For inputting the destination, either pressing a transmission method selecting button (3271 through 3274) corresponding to the transmission method thereof (e-mail, facsimile, printer, FTP) or pressing a detailed destination input area (3275 through 3278) brings up a numerical keypad (3050) for facsimile or the full keyboard (3040) otherwise, which enables input. Reference numerals 3279 through 3282 denote buttons for setting transmission options regarding the respective transmission methods, but the details thereof will be omitted here.

In the state that a Person class destination is selected in the Send main screen, pressing the Edit button (3210) also brings up the Person class detail sub screen (3290). Details of the selected destination are displayed in the relevant area of the detailed destination input areas (3275 through 3278), and displaying the keyboard with the above-described method enables editing of the destinations.

In the event that the Edit button (3210) is pressed in the state that a Database class destination is selected in the Send main screen, the Database class detail sub screen (3310) is displayed. The database name (3311) and folder list (3312) are displayed on the database class detail sub screen.

Pressing the Edit button (3210) in the state that a Group class destination is selected in the Send main screen brings up the Group class detail sub screen (3320).

A group member display (3321) is displayed in the Group class detail sub screen. The following is a description of the manner in which a Web client communicates with a Web server, accesses an address book database, obtains resources, and displays these on the Web client display, with reference to flowcharts.

Figure 2:
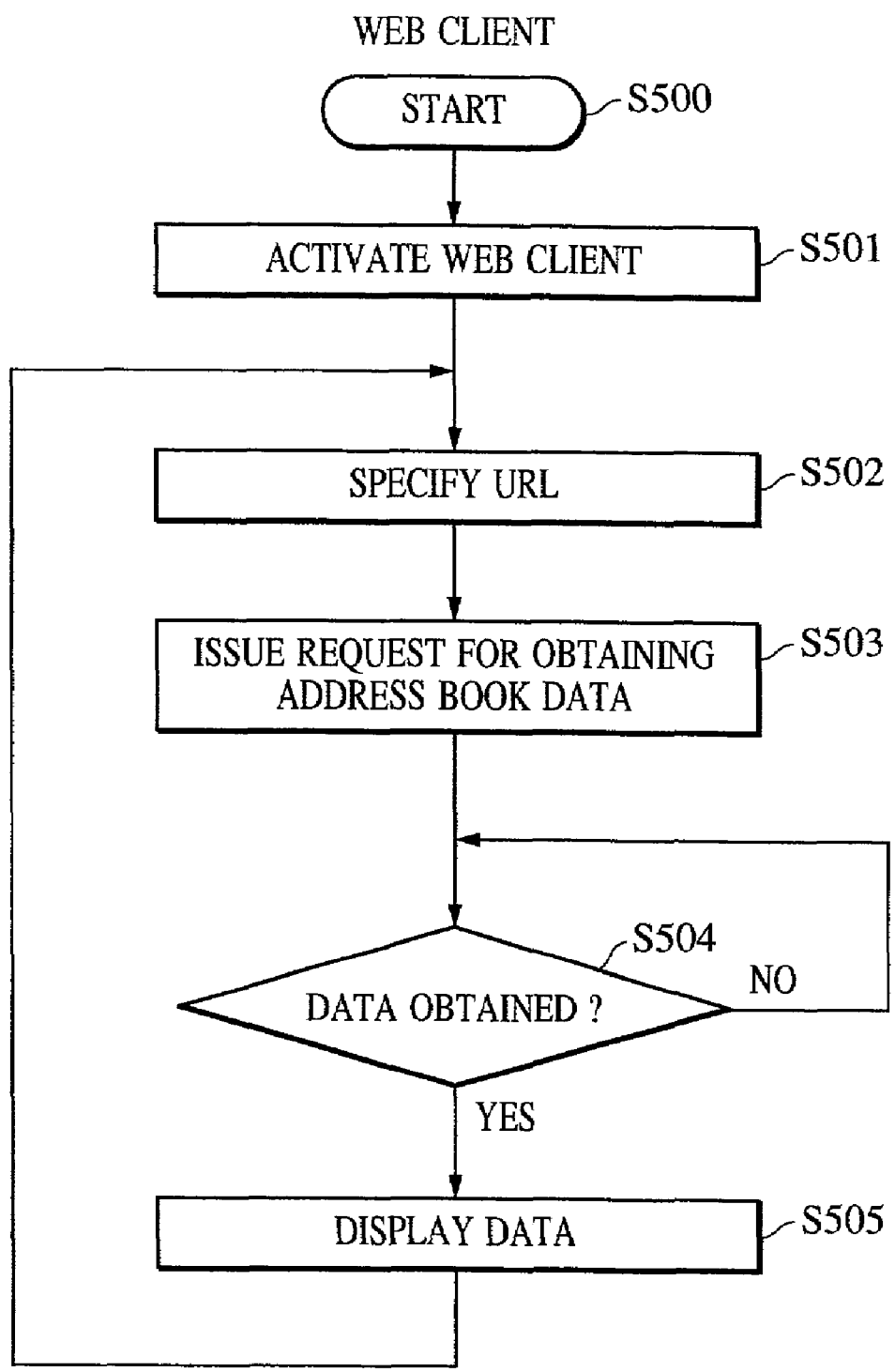
FIG. 2 is a flowchart of the operations of a Web client.

FIG. 2 is a flowchart indicating the actions of the Web client.

The action starts from step S500, and in the next step S501, the Web client is activated.

Next, in step S502, the location for accessing the Web server address book is input in the URL (Uniform Resource Locator) format.

Next, in step S503, a request for obtaining address book data is issued to the address of the URL.

Next, in step S504, the flow waits for data to return from the Web server. In the event that no data is returned, the flow returns to step S504. In the event that data is returned, the flow proceeds to step S505, and displays the obtained address book data on the display.

In the event that there are multiple address books, specifying separate URLs allows the Web server to make reference to the specified address book from the multiple address books, thus allowing multiple address books to be used.

Figure 3:
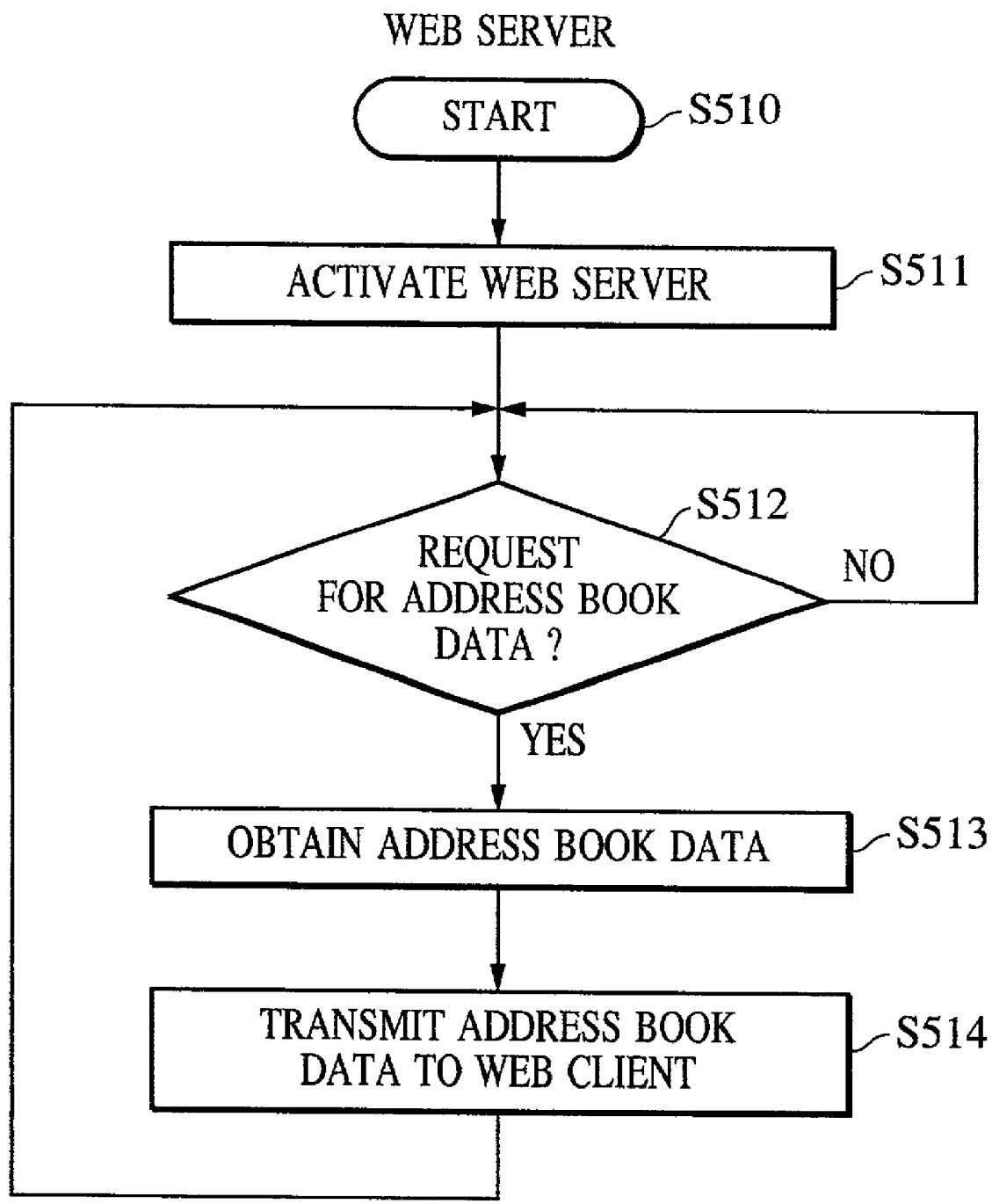
FIG. 3 is a flowchart of the operations of a Web server.

FIG. 3 is a flowchart indicating the actions of the Web server.

The processing starts from step S510. In the next step S511, the Web server is activated.

Next, in step S512, judgment is made regarding whether or not there has been an address book data request from the Web client. In the event that the results of this judgment show that a request for obtaining address book data has not been received, the flow returns to step S511, and waits a request to obtain address book data.

On the other hand, in the event that the results of the judgment in step S512 show that a request for obtaining has come, the flow proceeds to step S513, accesses the address book database, and obtains the specified data.

Next, the flow proceeds to step S514, and transmits the data obtained in the above step S513 to the Web client. Subsequently, the flow returns to step S512, and awaits an address book data request.

The image processing device according to the present embodiment acts as described above, and in the event that multiple Web servers have been activated, each can act independently. Accordingly, inquiries from multiple Web clients can be handled one-on-one, so multiple Web clients can be handled simultaneously.

(Second Embodiment)

Next, the second embodiment according to the present invention will be described with reference to FIGS. 15 through 20.

Figure 15:
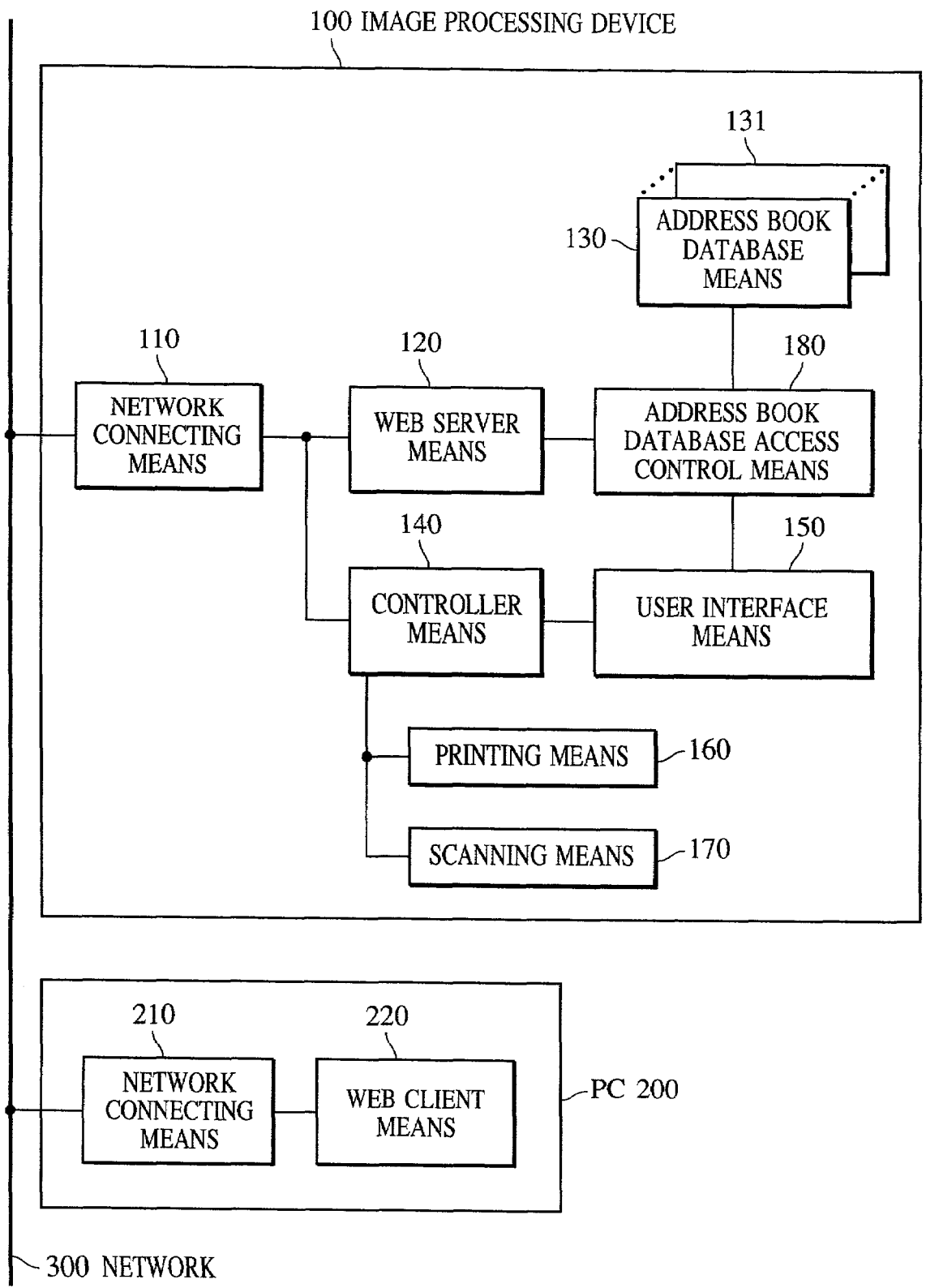
FIG. 15 is a block diagram illustrating the overall configuration of an image processing device according to a second embodiment.

In FIG. 15, reference numeral 300 denotes a network. An image processing device 100 is connected to the network 300. The means contained in the image processing device 100 are as follows.

That is, reference numeral 110 denotes network connecting means, 120 denotes Web server means, 130 denotes address book database means, 140 denotes controller means, 150 denotes user interface means, 160 denotes printing means, and 170 denotes scanning means.

Also, a PC (personal computer) 200 is connected to the network 300. A network connecting means 210 and Web client 220 are contained therein. The network connecting means 110 is connected to the network 300, and transmits and receives data with the network 300.

The Web server means 120 is a server means capable of communication by HTTP (HyperText Transfer Protocol), and acts in a manner corresponding to the HTTP contents.

The address book database means 130 is a database containing the destinations of image data to which transfer is to be made from the controller, of which the destinations can be selected by the user interface means 150.

The controller means 140 obtains image data from the scanning means 150 and outputs to the printing means 160. Also, the configuration is such that image data obtained with another image output device as the destination thereof can be transferred and output, and saved in a server database transferred with the server as the destination thereof, via the network connecting means 110.

<Description of the Overall System>

The configuration of the overall system of the present embodiment is the same as that described above with regard to FIG. 4, so detailed description thereof will be omitted. Also, the block configuration thereof is the same as that described above with regard to FIG. 5, so detailed description thereof will also be omitted.

Figure 16:
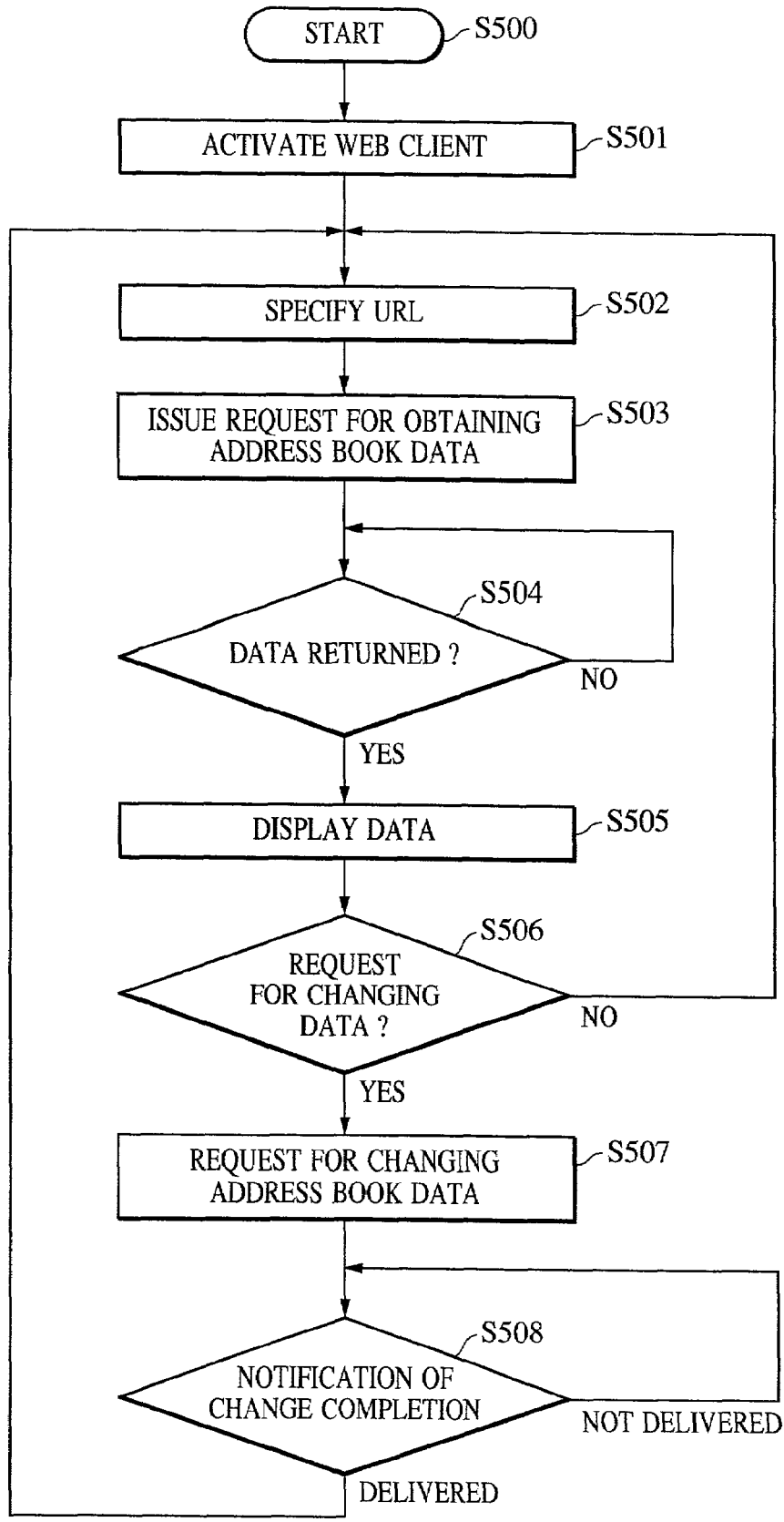
FIG. 16 is a flowchart describing the operations of a Web client.

Next, the action of the Web client will be described with reference to the flowchart in FIG. 16.

The action starts from step S500, and in the next step S501, the Web client is activated.

Next, in step S502, the location for accessing the Web server address book is input in the URL (Uniform Resource Locator) format.

Next, in step S503, a request for obtaining address book data is issued to the location of access to the address book of the Web server, i.e., the address of the URL.

Next, in step S504, the flow waits for data to return from the Web server. In the event that no data is returned, the flow returns to step S504. In the event that data is returned, the flow proceeds to step S505. In step S505, the obtained address book data is displayed on the screen of the Web client.

Next, in step S506, the flow checks whether or not there is change to the address book data. In the event that the results of this check show that there is no change to the address book data, the flow returns to step S502. Also, in the event that there is change to the address book data, the flow proceeds to step s507.

In step S507, the address book data change request is sent to the location of access of the address book by the Web server.

Next, in step S508, the flow checks whether or not a change completion notification has been returned from the Web server.

In the event that the results of the check in step S508 show that a change completion notification has not been returned from the Web server, the flow repeatedly performs the processing of step S508, and the check is continued. Also, in the event that a change completion notification has been returned from the Web server, the flow returns to step S502 and processes another request.

Figure 17:
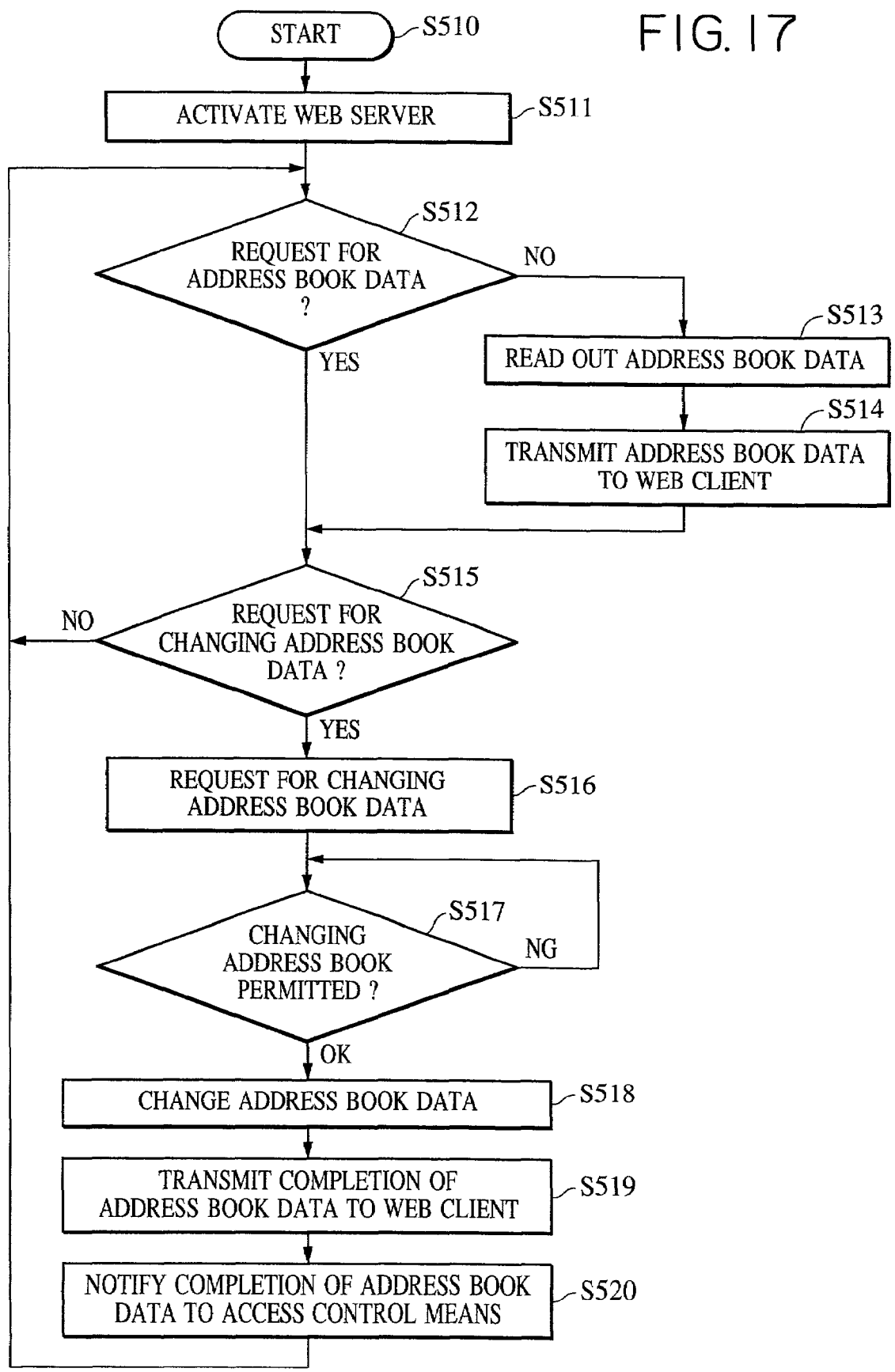
FIG. 17 is a flowchart describing the operations of a Web server.

Next, the action of the Web server will be described with reference to FIG. 17.

The processing starts from step S510. First, in step S511, the Web server is activated. Next, in step S512, checking is performed regarding whether or not there has been an address book obtaining request from the Web client.

In the event that a request for obtaining an address book has come from a Web client, the flow proceeds to step S513. In step S513, the address book data is read out, and in the next step S514 the address data is transmitted to the Web client.

On the other hand, in the event that the results of step S512 show that a request for obtaining an address book has not come from the Web client, the flow proceeds to step S515. In step S515, checking is performed regarding whether or not there has been an address book changing request from the Web client. In the event that a request for changing has not been received, the flow returns to step S512, and awaits an address book data request.

On the other hand, in the event that a changing request has been received, the flow proceeds to step S516. In step S516, the address book data changing request is performed to the address book access control means. In step S517, a check is performed whether or not permission for changing the address book has come from the address book access control means.

In the event that the results of the check show that permission has not been granted, the flow returns to step S517, and waits for permission. Also, in the event that permission has been granted, the flow proceeds to step S518. In step S518, the address book data is changed.

In step S519, an address book data change completion is transmitted to the Web client. Next, in step S520, the address book data change completion is reported to the address book access control means.

Next, the action of the address book access control means will be described with reference to the flowchart in FIG. 18.

Starting from step S530, in step S531, a check is performed regarding whether or not there has been a request for change from the Web server.

In the event that the results of the check show that there has been a request for change, the flow proceeds to step S532. In step S532, the Web server is given permission to change. Next, in step S533, the flow waits for notification of completion of change from the Web server.

In the event that a completion notification is not received, the flow stands by in step S533 until the completion notification comes. In the event that the change completion notification has come, the flow proceeds to step S534. In step S534, a check is performed regarding whether or not there has been a request for change from the user interface.

In the event that the results of the check show that there has been a request for change from the user interface, the flow proceeds to step S535. In step S535, the user interface is given permission to change. Then, after giving the permission to change, the action shown in the flowchart in FIG. 20 which will be described later is started.

Figure 20:
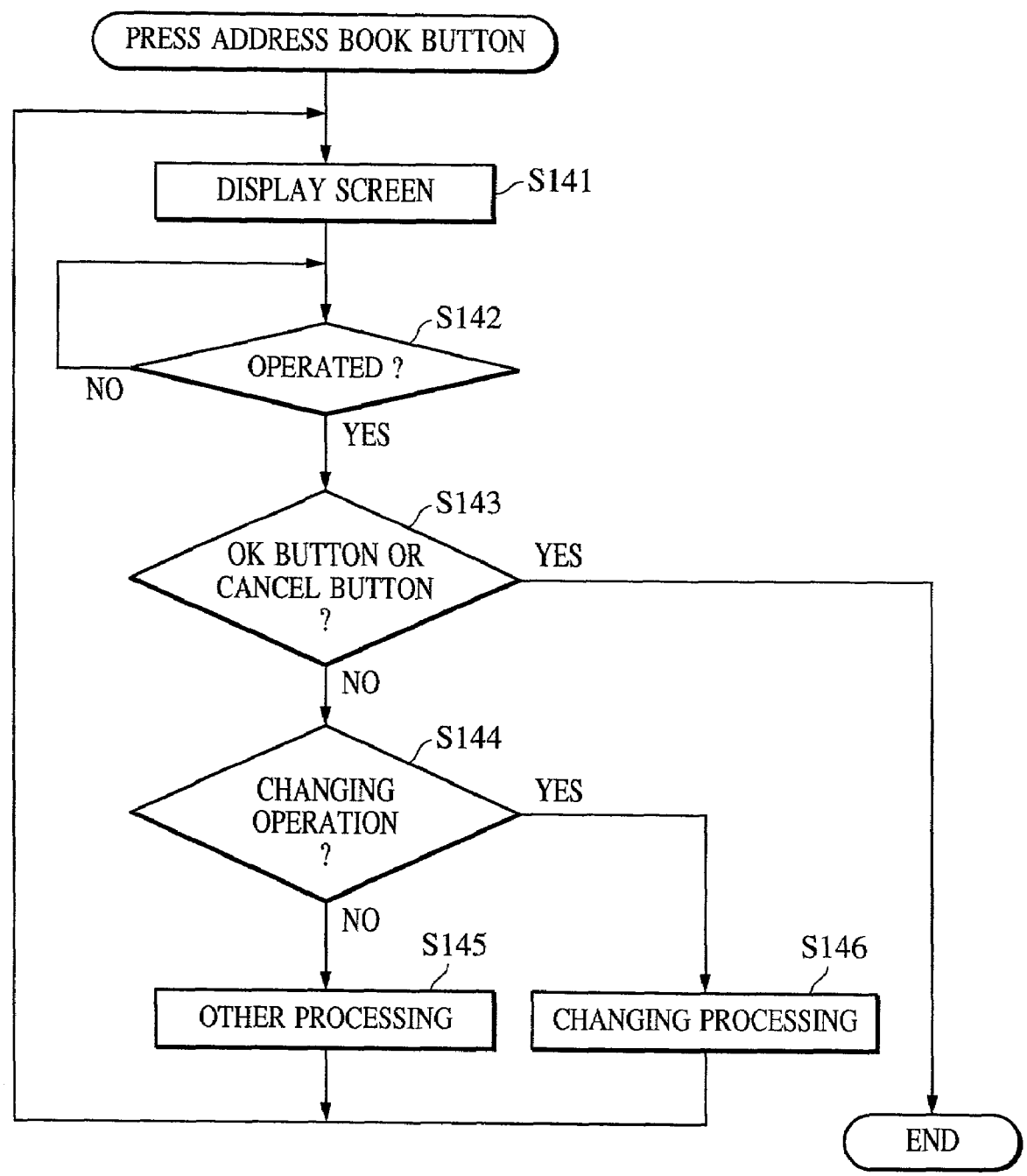
FIG. 20 is a flowchart describing the actions taken while the address book button is pressed down.
Figure 21:
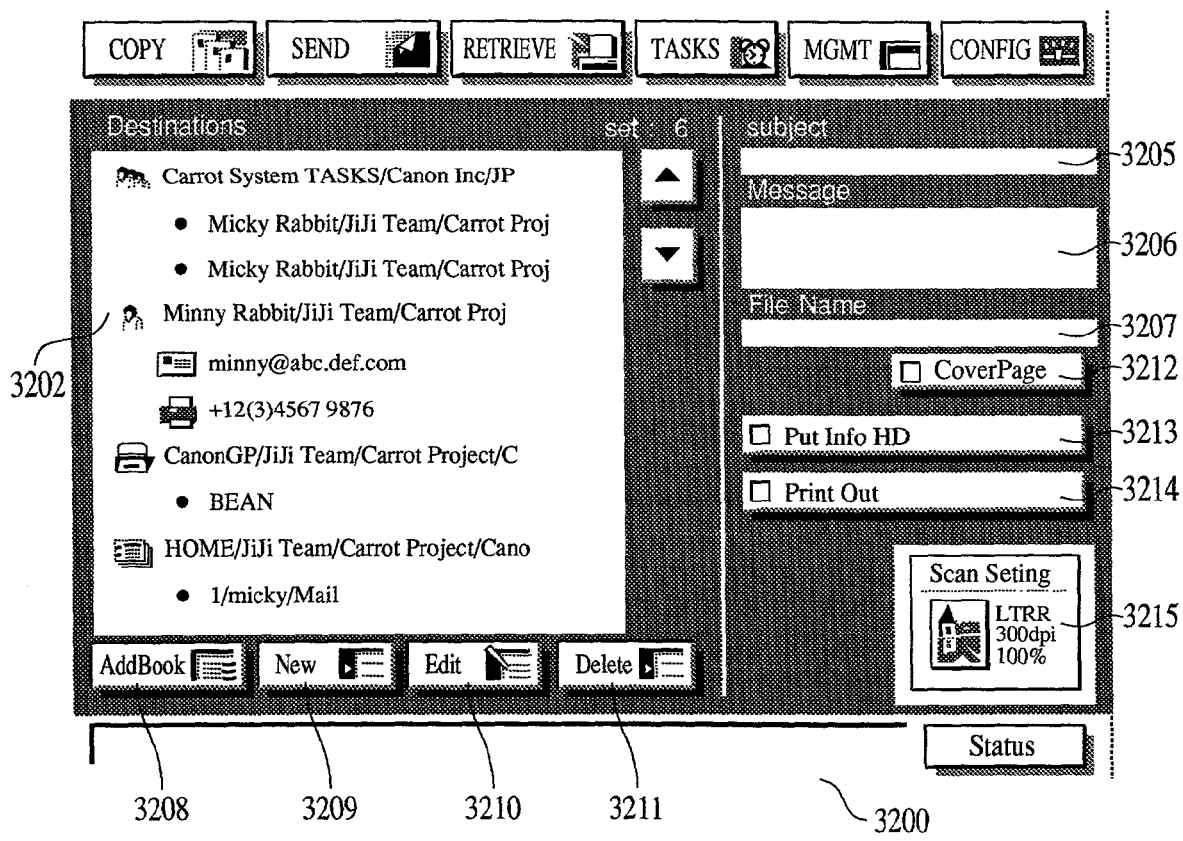
FIG. 21 is a diagram illustrating a setting screen for the SEND function for distributing various types of data.
Figure 22:
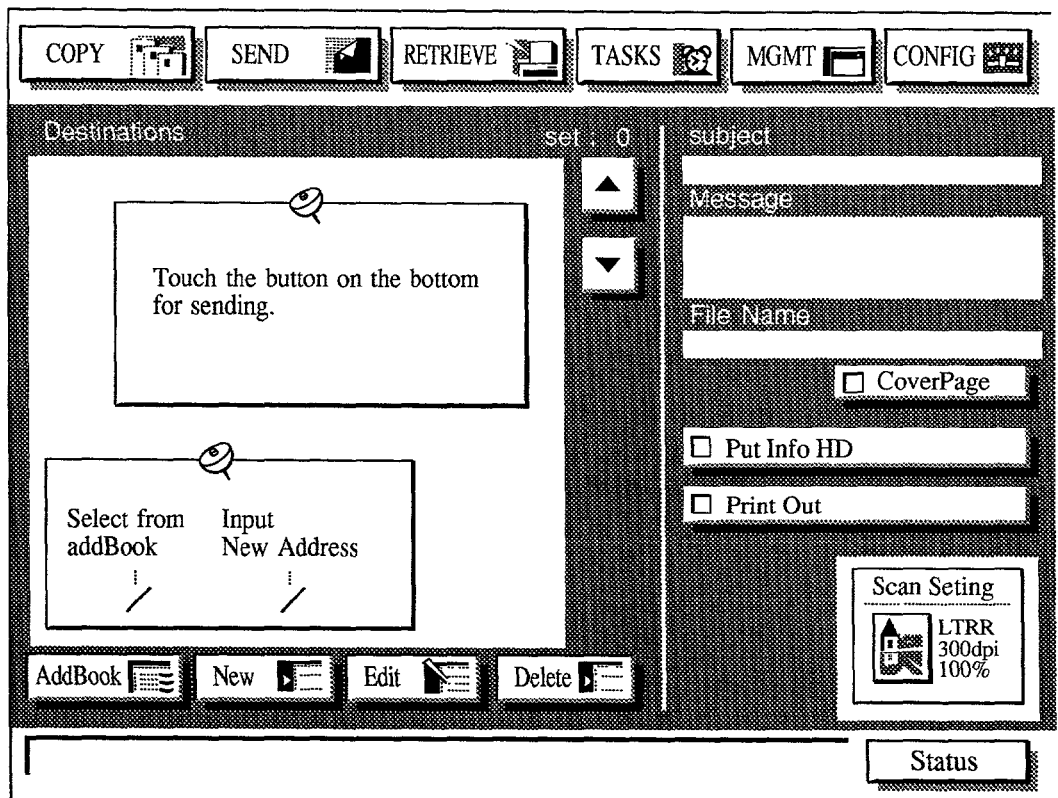
FIG. 22 is another diagram illustrating a setting screen for the SEND function for distributing various types of data.
Figure 23:
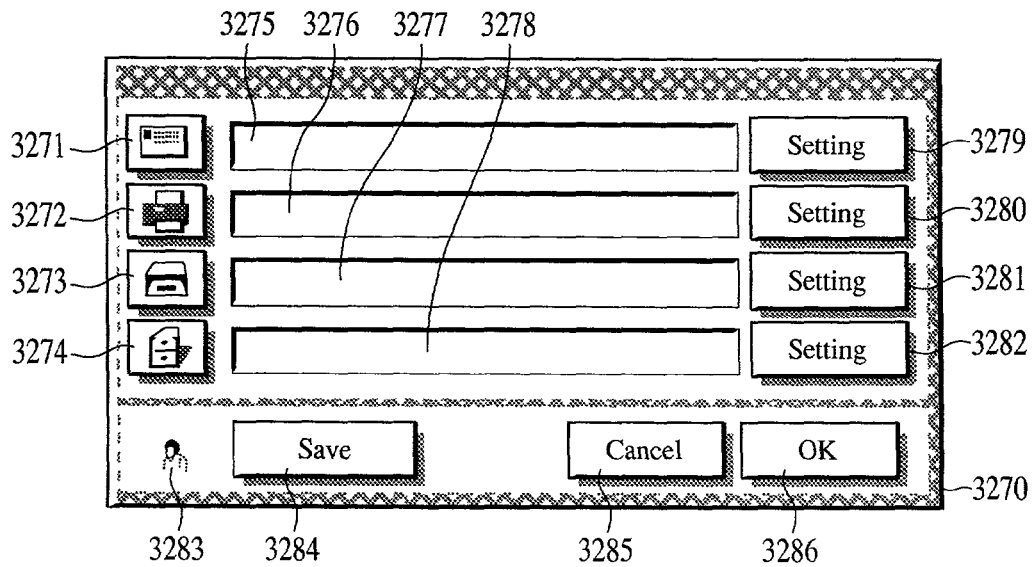
FIG. 23 is a diagram illustrating an example of a detailed destination screen of the address book.
Figure 24:
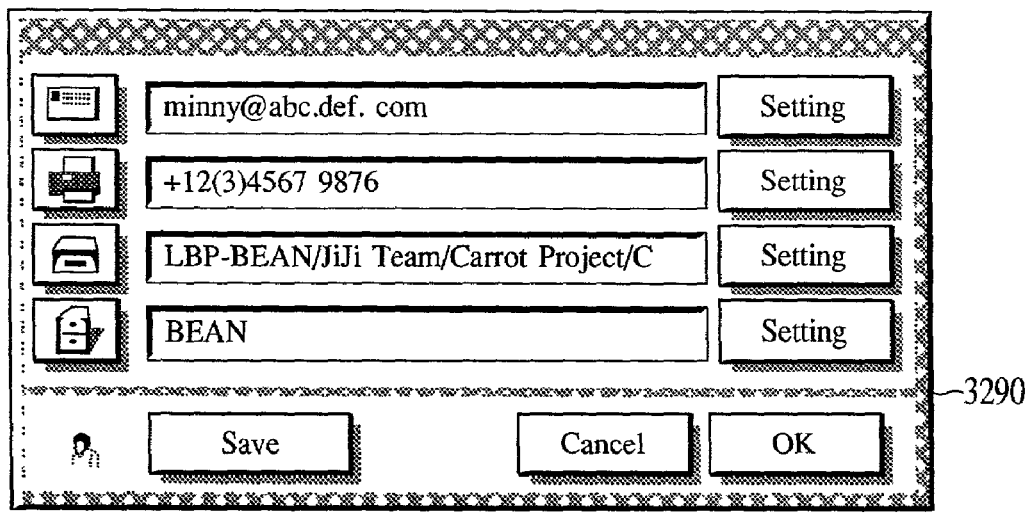
FIG. 24 is another diagram illustrating an example of a detailed destination screen of the address book.
Figure 25:
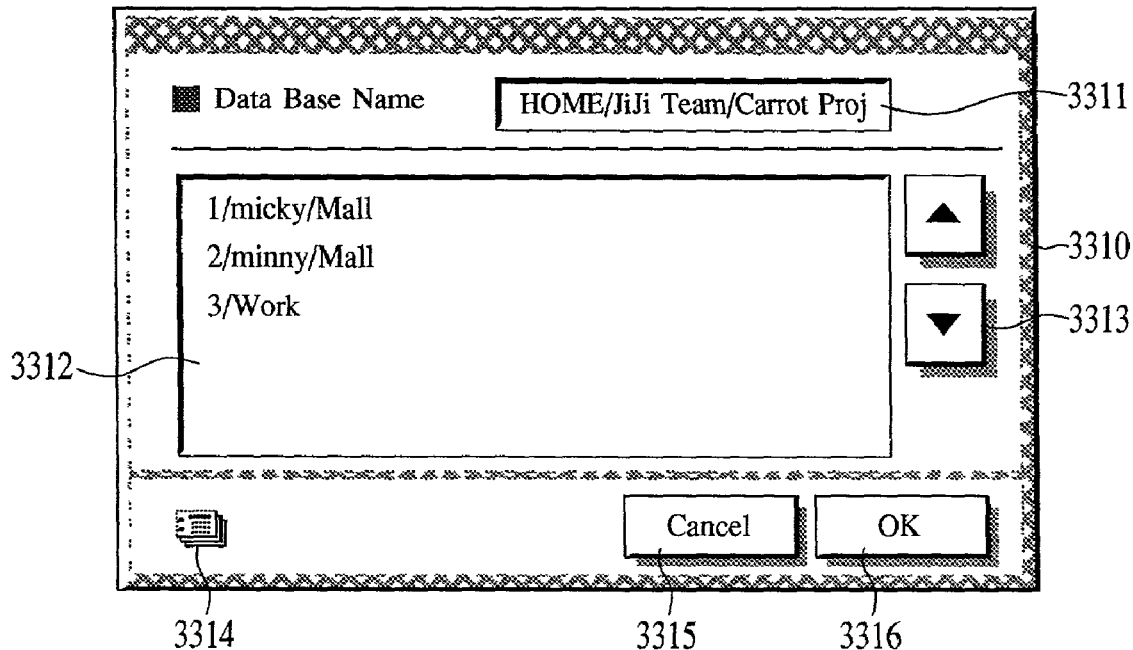
FIG. 25 is another diagram illustrating an example of a detailed destination screen of the address book.
Figure 26:
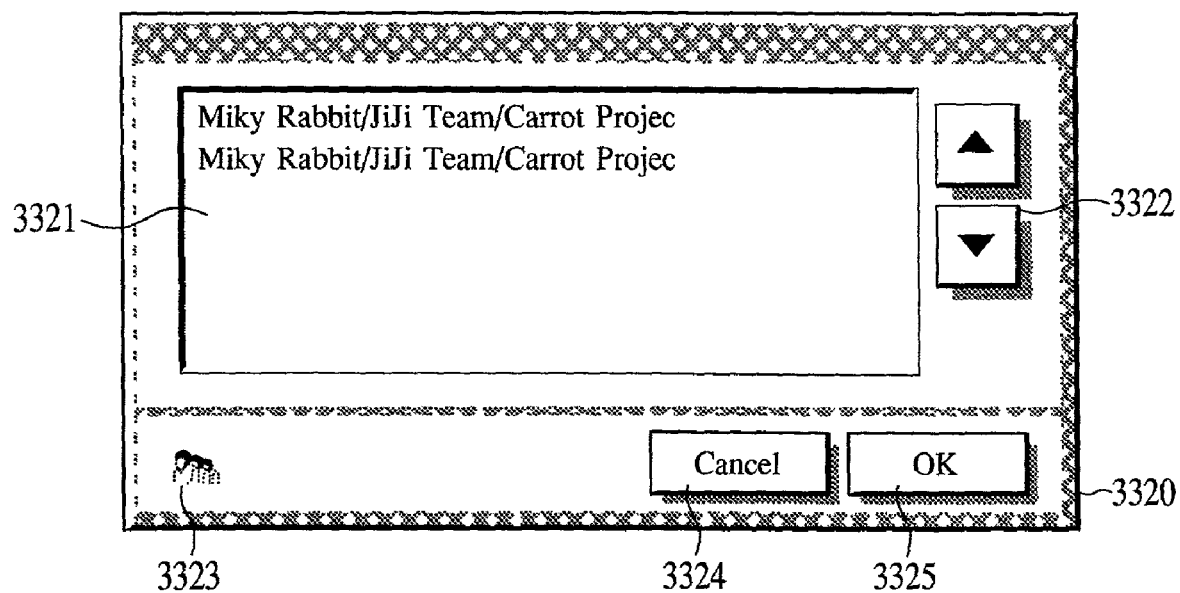
FIG. 26 is yet another diagram illustrating an example of a detailed destination screen of the address book.

Next, once the action shown in the flowchart in FIG. 20 is completed, in step S536, the flow waits for notification of completion of change from the user interface. In the event that the notification of completion is received, the flow returns to step S531, and repeats the above-described processing.

As described above, according to the present embodiment, in step S531 recognition is made from which Web server a request for change has been made, in step S532 permission to change is given to the Web server from which there has been a request, and in step S533 the flow waits for changing by the Web server to which permission has been given to end, so access from multiple Web servers can be exclusively controlled.

Also, in step S536, the notification of completion from the user interface is made at the time of completing the address book-related operating screen rather than the time of completing changing of the address book, so changing from the Web client can be forbidden during that time, and priority can be given to changes in settings from the user interface attached to the image processing device.

As described above with the flowcharts, according to the present embodiment, changing of the address books is subjected to exclusive processing so that changes cannot be made at arbitrary timing, and further, changes are made after obtaining data, thereby preventing data from being rewritten by changes from the outside.

Figure 19:
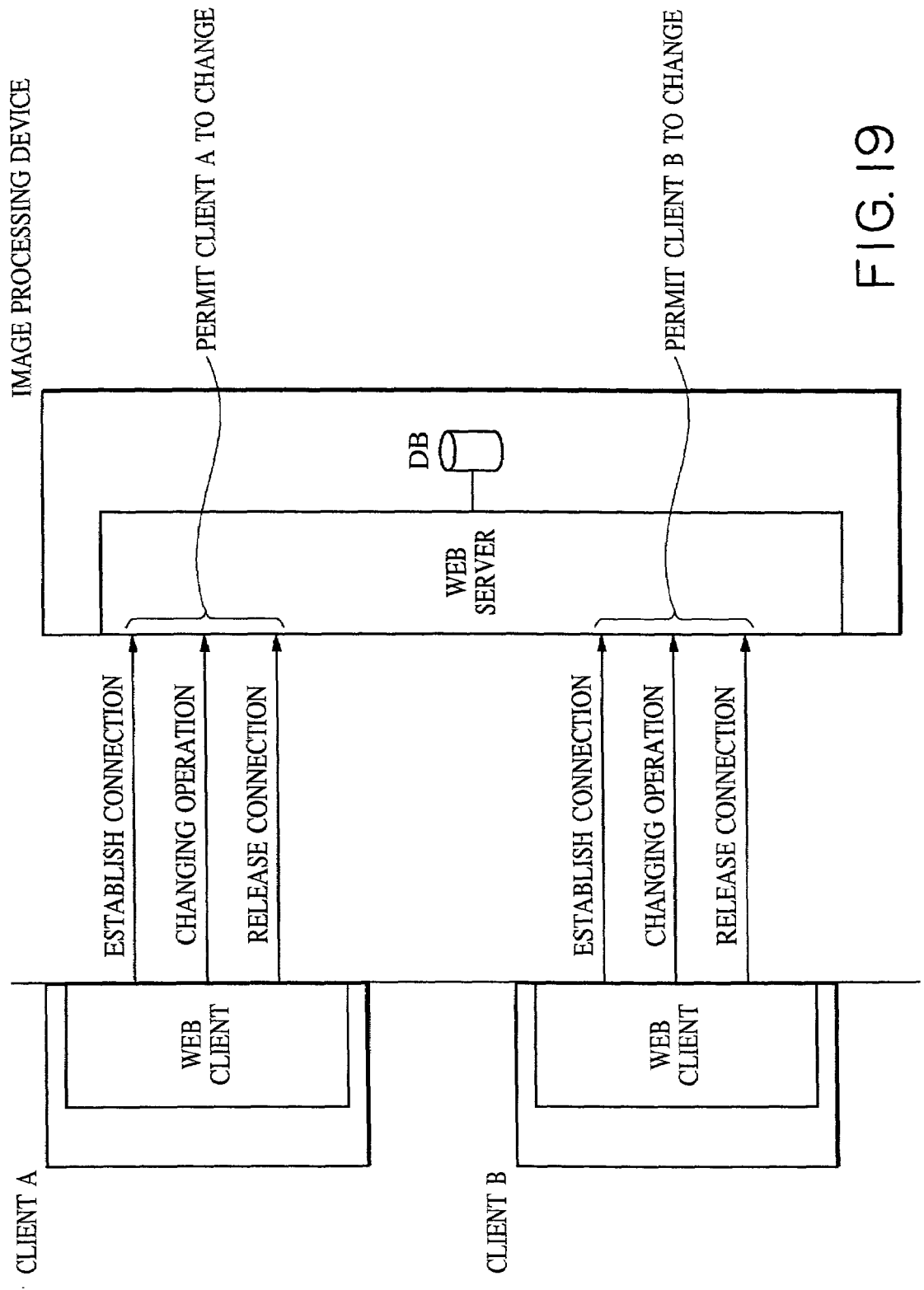
FIG. 19 is a sequence diagram describing the operations of making changes from a remote panel, which is performed between client and server.

Next, operations of changing from the remote panel will be described with reference to the sequence chart shown in FIG. 19.

Figure 18:
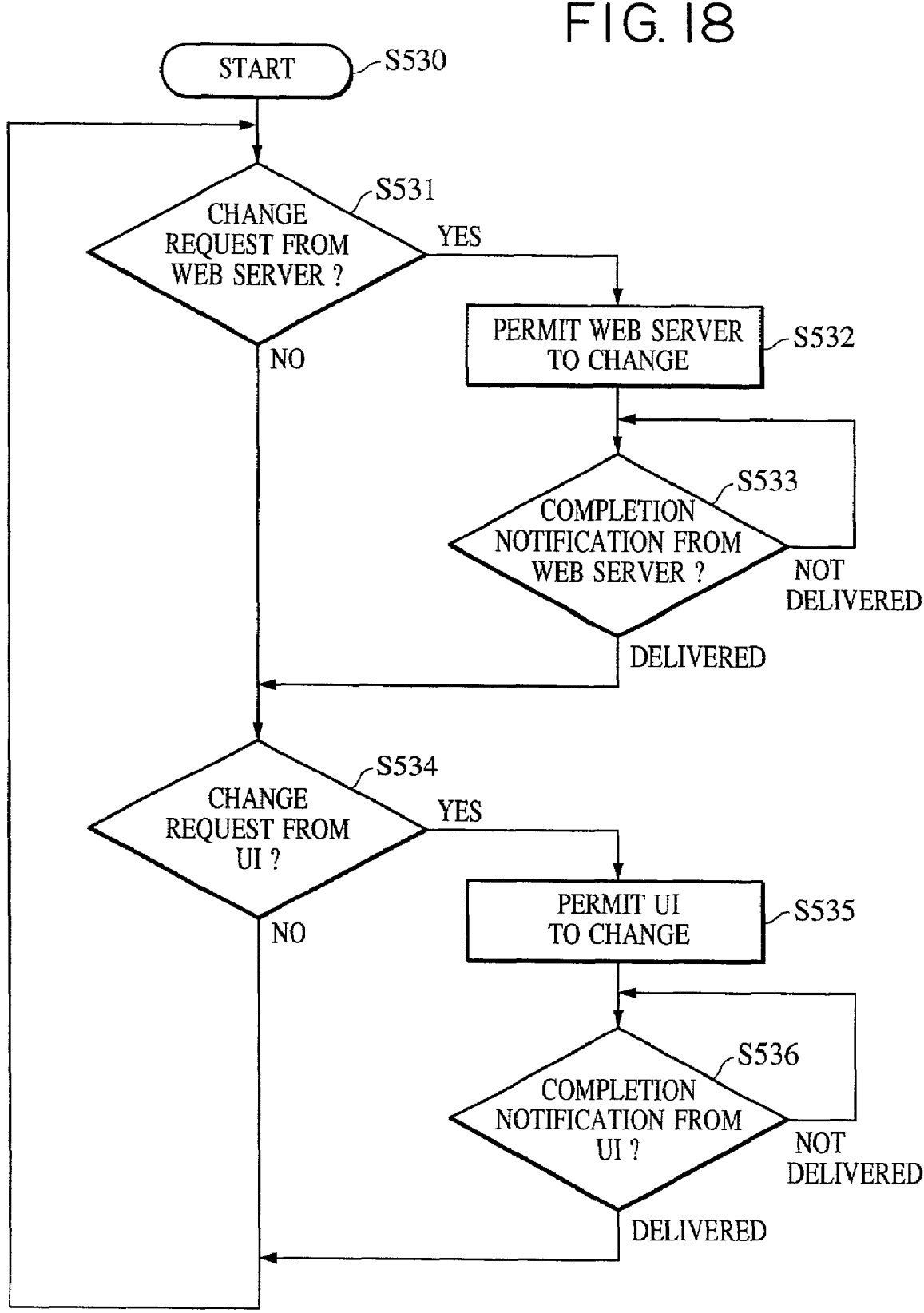
FIG. 18 is a flowchart illustrating the operations of address book access control.

In step S531 in the flowchart shown in FIG. 18, following the establishment of a communication session with a client, the Web server 120, upon receiving a message containing changing operations (e.g., as a post method message in HTTP), performs a changing request to the access control means 180.

Then, following the release of the communication connection with the client, in step S533 the Web server 120 makes completion notification to the access control means 180.

FIG. 20 is a flowchart illustrating address book operations from the local panel.

Pressing the address book button in step S534 in FIG. 18 causes the UI 1501 to request changes to the access control means 180.

Then, as shown in FIG. 20, in step S141, a screen comes up. Next, in step S142, judgment is made whether or not operation has been performed.

In the event that the results of this judgment show that operation has not been performed, the flow stands by until operation is performed. Then, in the event that operation has been performed, the flow proceeds to step S143, and judgment is made whether the "OK" button or "Cancel" button has been operated.

In the event that the results of this judgment show that the "Cancel" button has been operated, the processing ends. If otherwise, i.e., in the event that the "OK" button has been operated, the flow proceeds to step S144, and judgment is made regarding whether or not the operation is a changing operation.

In the event that the results of this judgment show that the operation is not a changing operation, the flow proceeds to step S145 and performs other processing. Also, in the event that the operation is a changing operation, the flow proceeds to step S146 and performs the changing processing, and subsequently, returns to step S141 and repeatedly performs the above-described processing.

(Other Embodiments)

The present invention can be applied to systems configured of multiple pieces of equipment (e.g., host computer, interface device, reader, printer, etc.), or a stand-alone device.

Also, the functions of the above-described embodiments can be achieved by an arrangement wherein software program code for realizing the functions of the above embodiments is supplied to a device connected to the above devices or a computer within a system, and the devices are operated according to the program stored in the computer (CPU or MPU) of the system or device; such an arrangement is also within the scope of the present invention.

In this case, the software program code itself realizes the functions of the above-described embodiments, and the program code itself, and means for supplying the program code to the computer, e.g., a storing medium storing the program code, comprise the present invention. Examples of storing mediums which can be used for storing the program code include floppy disks, hard disks, optical disks, magneto-optical disks, CD-ROMs, magnetic tape, non-volatile memory cards, ROM, and so forth.

Also, it is needless to say that the present invention encompasses cases not only where the computer executing the supplied program code realizes the functions of the above embodiments, but also where the program code cooperatively realizes the functions of the above embodiments with the operating system or other applications running on the computer.

Further, the scope of the present invention also encompasses arrangements wherein the supplied program code is stored to memory provided in function expansion boards in the computer or function expansion units connected to the computer, following which a CPU or the like provided to the function expansion board or function expanding unit performs all or part of the actual processing based on instructions of the program code, so as to realize the functions of the above embodiments thereby.

As described above, according to the present invention, multiple Web server means which are each capable of operating independently are capable of handling inquiries from multiple Web client means on a one-on-one basis, so multiple Web clients can be simultaneously handed via a network. Thus, address book data can be browsed from the Web clients via the network, and troublesome operations such as searching from the small screen attached to the device or confirming details can be done away with.

Also, according to another characteristic of the present invention, two or more individuals can simultaneously browse address book data from multiple Web client means, thereby doing away with the trouble of waiting for turns to browse on the device screen.

Also, according to another characteristic of the present invention, writing to the address book is exclusively controlled, so the problem of one operator editing or deleting the contents of a database while unaware that another operator is using the data for reading out or the like can be done away with. Accordingly, other use of a changed address book database by another operator unaware that the contents have been changed can be prevented, thereby effectively preventing data from being sent to a wrong destination or the like.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A communication device having an address book storing data of communication destinations, said communication device comprising:

first access means for accessing data of said address book in response to operations of a local user interface;

second access means for accessing data of said address book in response to requests from remote devices on a network;

control means for deciding to permit or deny address book data changing requests from said first access means, and from said second access means;

first display control means for displaying a first guide display on the local user interface, wherein the first guide display is operable by a local user to access data of said address book from said first access means; and judgment means for judging whether or not the first guide display is displayed on the local user interface, wherein said control means denies address book changes from said second access means when it is judged by said judgment means that the first guide display is displayed on the local user interface, even if change of said address book is completed by said first access means, and permits address book changes from said second access means when it is judged by said judgment means that the first guide display is not displayed on the local user interface.

2. A communication device according to claim 1, further comprising second display control means for displaying a second guide display on a remote user interface of the remote devices, wherein said second guide display is operable by a remote user to access data of said address book from said second access means, and wherein said control means permits address book data changing requests from said first access means oven in the event that said second guide display is being displayed on the remote user interface of the remote devices.

3. A communication device according to claim 1, wherein said address book stores addresses corresponding to multiple communication protocols for each destination.

4. A communication device according to claim 1, wherein said second access means accesses data of said address book in response to WWW server function requests from the remote devices.

5. A communication device having an address book storing data of communication destinations, said communication device comprising:
   a local operating unit for accessing data of said address book for a local user via a local user interface;
   a remote operating unit for accessing data of said address book for remote users on a network;
   a control unit for deciding to permit or deny address book data changing requests from said local operating unit, and from said remote operating unit;
   a first display control unit for displaying a first guide display on the local user interface, wherein the first guide display is operable by the local user to access data of said address book from said local operating unit; and
   a judgment unit for judging whether or not the first guide display is displayed on the local user interface,
   wherein said control unit denies address book changes from said remote operating unit when it is judged by said judgment unit that the first guide is displayed on the local user interface, even if change of said address book is completed by said local operating unit, and permits address book changes from said remote operating unit when it is judged by said judgment unit that the first guide display is not displayed on the local user interface.

6. A method for accessing an address book within a communication device, said method comprising:
   a first access step for accessing data of said address book in response to operations of a local user interface;
   a second access step for accessing data of said address book in response to requests from remote devices on a network;
   a control step for deciding to permit or deny address book data changing requests in said first access step, and in said second access step;
   a first display control step for displaying a first guide display on the local user interface, wherein the first guide display is operable by a local user to access data of said address book in said first access stop; and
   a judgment step for judging whether or not the first guide display is displayed on the local user interface,
   wherein said control step denies address book changes in said second access step when it is judged in said judgment step that the first guide display is displayed on the local user interface, even if change of said address book is completed in said first access step, and permits address book changes in said second access step when it is judged in said judgment step that the first guide display is not displayed on the local user interface.

7. A method according to claim 6, further comprising a second display control step for displaying a second guide display on a remote user interface of the remote devices, wherein said second guide display is operable by a remote user to access data of said address book in said second access step,
   and wherein said control step permits changing the data of said address book in said first access step even in the event that said second guide display is being displayed on the remote user interface of the remote devices.

8. A method according to claim 6, wherein said address book stores addresses corresponding to multiple communication protocols for each destination.

9. A method according to claim 6, wherein said second access step accesses data of said address book in response to WWW server function requests from the remote devices.

10. A method for accessing an address book within a communication device, said method comprising:
    a local operating step for accessing data of said address book for a local user via a local user interface;
    a remote operating step for accessing data of said address book for remote users on a network;
    a control step for deciding to permit or deny address book data changing requests in said local operating step, and in said remote operating step;
    a first display control step for displaying a first guide display on the local user interface, wherein the first guide display is operable by the local user to access data of said address book in said local operating step; and
    a judgment step for judging whether or not the first guide display is displayed on the local user interface,
    wherein said control step denies address book changes in said remote operating step when it is judged in said judgment step that the first guide display is displayed on the local user interface, even if change of said address book is completed in said local operating step, and permits address book changes in said remote operating step when it is judged in said judgment step that the first guide display is not displayed on the local user interface.

11. A computer program executed by a computer of a communication device for accessing an address book within the communication device, said computer program comprising process procedure code for:
    a first access step for accessing data of said address book in response to operations of a local user interface;
    a second access step for accessing data of said address book in response to requests from remote devices on a network;
    a control step for deciding to permit or deny address book data changing requests in said first access step, and in said second access step;
    a first display control step for displaying a first guide display on the local user interface, wherein the first guide display is operable by a local user to access data of said address book in said first access step; and a judgment step for judging whether or not the first guide display is displayed on the local user interface, wherein said control step denies address book changes in said second access step when it is judged in said judgment step that the first guide display is displayed on the local user interface, even if change of said address book is completed in said first access step, and permits address book changes in said second access step when it is judged in said judgment step that the first guide display is not displayed on the local user interface.

12. A computer-readable storage medium storing the computer program according to claim 11.

13. A computer program executed by a computer of a communication device for accessing an address book within the communication device, said computer program comprising process procedure code for:

a local operating step for accessing data of said address book for a local user via a local user interface;

a remote operating step for accessing data of said address book for remote users on a network;

a control step for deciding to permit or deny address book data changing requests in said local operating step, and in said remote operating step;

a first display step for displaying a first guide display on the local user interface, wherein the first guide display is operable by the local user to access data of said address book in said local operating step; and a judgment step for judging whether or not the first guide display is displayed on the local user interface, wherein said control step denies address book changes in said remote operating step when it is judged in said judgment step that the first guide display is displayed on the local user interface, even if change of said address book is completed in said local operating step, and permits address book changes in said remote operating step when it is judged in said judgment step that the first guide display is not displayed on the local user interface.

14. A computer-readable storage medium storing the computer program according to claim 13.

15. A communication device having an address book storing data of communication destinations, said communication device comprising:

first access means for accessing data of said address book in response to operations of a local user interface;

second access means for accessing data of said address book in response to requests from remote devices on a network;

judgment means for judging whether or not a display regarding said address book is displayed on an operating screen of said communication device; and control means for controlling to permit or prevent changing of said address book, wherein said control means prevents changing of said address book by said second access means when it is judged by said judgment means that the display regarding said address book is being displayed on the operating screen of said communication device, even if change of said address book is completed by said first access means, and permits changing of said address book by said second access means when it is judged by said judgment means that the display regarding said address book is not being displayed on the operating screen of said communication device.

16. A method for accessing an address book within a communication device, said method comprising;

a first access step of accessing data of said address book in response to operations of a local user interface;

a second access step of accessing data of said address book in response to requests from remote devices on a network;

a judgments step for judging whether or not a display regarding said address book is displayed on an operating screen of said communication device; and a control step of controlling to permit or prevent changing of said address book, wherein said control steps prevents changing of said address book in said second access step when it is judged in said judgment step that the display regarding said address book is being displayed on the operating screen of said communication device, even if change of said address book is completed in said first access step, and permits changing of said address book in said second access step when it is judged in said judgment step that the display regarding said address book is not being displayed on the operating screen of said communication device.

* * * * *

UNITED STATES PATENT AND TRADEMARK OFFICE
CERTIFICATE OF CORRECTION

PATENT NO.        : 7,124,185 B2  
APPLICATION NO. : 09/835444  
DATED              : October 17, 2006  
INVENTOR(S)      : Satoshi Kuroyanagi It is certified that error appears in the above-identified patent and that said Letters Patent is hereby corrected as shown below:

DRAWINGS:
Sheet 7, Figure 7, "Shiff" should read -- Shift --.

COLUMN 10:
Line 30, "waits" should read -- awaits --.

COLUMN 11:
Line 40, "step s507." should read -- step S507. --.

COLUMN 15:
Line 17, "oven" should read -- even --; and
Line 67, "access stop;" should read -- access step; --.

COLUMN 18:
Line 29, "judgments" should read -- judgment --; and
Line 34, "steps" should read -- step --.

Signed and Sealed this

Twenty-sixth Day of June, 2007

JON W. DUDAS  
*Director of the United States Patent and Trademark Office*